United States Patent
He et al.

(10) Patent No.: US 11,640,257 B2
(45) Date of Patent: May 2, 2023

(54) DATA PROCESSING METHOD AND APPARATUS

(71) Applicant: HUAWEI TECHNOLOGIES CO., LTD., Guangdong (CN)

(72) Inventors: Cheng He, Shenzhen (CN); Qun Huang, Hong Kong (CN); Pak-Ching Lee, Hong Kong (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 324 days.

(21) Appl. No.: 16/259,138

(22) Filed: Jan. 28, 2019

(65) Prior Publication Data

US 2019/0171367 A1 Jun. 6, 2019

Related U.S. Application Data

(63) Continuation of application No. PCT/CN2017/089671, filed on Jun. 23, 2017.

(30) Foreign Application Priority Data

Jul. 28, 2016 (CN) .......................... 201610616360.3

(51) Int. Cl.
*G06F 3/06* (2006.01)
*G06F 11/14* (2006.01)

(52) U.S. Cl.
CPC .............. *G06F 3/065* (2013.01); *G06F 3/067* (2013.01); *G06F 3/0619* (2013.01); *G06F 3/0656* (2013.01); *G06F 11/14* (2013.01)

(58) Field of Classification Search
CPC ........ G06F 3/065; G06F 11/14; G06F 3/0619; G06F 3/0656; G06F 3/067;

(Continued)

(56) References Cited

U.S. PATENT DOCUMENTS 6,377,562 B1 * 4/2002 Schneider ............. H04J 3/1682
370/330
7,818,757 B1 * 10/2010 Tsimelzon ............. G06F 9/546
719/321

(Continued)

FOREIGN PATENT DOCUMENTS

CN 1838580 A 9/2006
CN 102624881 A 8/2012

(Continued)

OTHER PUBLICATIONS

Tyler Akidau et al, MillWheel: Fault-Tolerant Stream Processing at Internet Scale. Proceedings of the VLDB Endowment, vol. 6, No. 11, Aug. 26-30, 2013, 12 pages.

(Continued)

*Primary Examiner* — David Yi
*Assistant Examiner* — Alan Otto

(57) ABSTRACT

In a data processing method, a worker node in a distributed data processing system receives first data from an upstream worker node. The first data has been stored in a buffer of the upstream worker node. The worker node sends a first portion of the first data to a persistent storage device of the distributed data processing system for persistent backup, and performs computational processing on the first data to generate second data. Prior to completing performing computational processing on the first data, the worker node sends acknowledgement information to the upstream worker node to instruct the upstream node to delete the first data from the buffer of the upstream worker node. The worker node then sends the second data to a downstream worker node in the distributed data processing system for further processing by the downstream worker node.

13 Claims, 9 Drawing Sheets

(58) Field of Classification Search
CPC ............. G06F 11/1471; G06F 11/1438; G06F 11/1451; G06F 11/1464
See application file for complete search history.

(56) References Cited

U.S. PATENT DOCUMENTS

| | | | | |
|---|---|---|---|---|
| 8,713,376 | B1* | 4/2014 | Makin | G06F 11/1461 714/47.1 |
| 9,069,681 | B1 | 6/2015 | Qiu et al. | |
| 9,092,338 | B1 | 7/2015 | Qiu et al. | |
| 9,940,241 | B1* | 4/2018 | Mehrotra | G06F 3/0613 |
| 10,623,281 | B1* | 4/2020 | Zhao | H04L 41/5022 |
| 2006/0230174 | A1 | 10/2006 | Hoche et al. | |
| 2009/0210631 | A1 | 8/2009 | Bosworth et al. | |
| 2010/0325352 | A1* | 12/2010 | Schuette | G06F 3/0685 711/103 |
| 2012/0137164 | A1 | 5/2012 | Uhlig et al. | |
| 2013/0086418 | A1 | 4/2013 | Sakurai et al. | |
| 2016/0026530 | A1 | 1/2016 | Krishnamurthy et al. | |
| 2016/0162325 | A1 | 6/2016 | Larson | |
| 2016/0164719 | A1 | 6/2016 | Pan et al. | |
| 2018/0349230 | A1* | 12/2018 | Gupta | G06F 11/1451 |

FOREIGN PATENT DOCUMENTS

| | | |
|---|---|---|
| CN | 103888378 A | 6/2014 |
| CN | 104038364 B | 9/2015 |
| CN | 105204961 A | 12/2015 |
| CN | 105339939 A | 2/2016 |
| CN | 105635116 A | 6/2016 |
| WO | WO-2015101026 A1 * | 7/2015 ......... H04L 41/0654 |

OTHER PUBLICATIONS

Jeong-Hyon Hwang et al, A Cooperative, Self-Configuring High-Availability Solution for Stream Processing. 2007 IEEE 23rd International Conference on Data Engineering, Jun. 4, 2007, 10 pages.

Zhengping Qian et al, TimeStream: Reliable Stream Computation in the Cloud. Eurosys'13 Apr. 15-17, 2013, Prague, Czech Republic, 14 pages.

Leonardo Neumeyer et al, S4: Distributed Stream Computing Platform. 2010 IEEE, 8 pages.

* cited by examiner

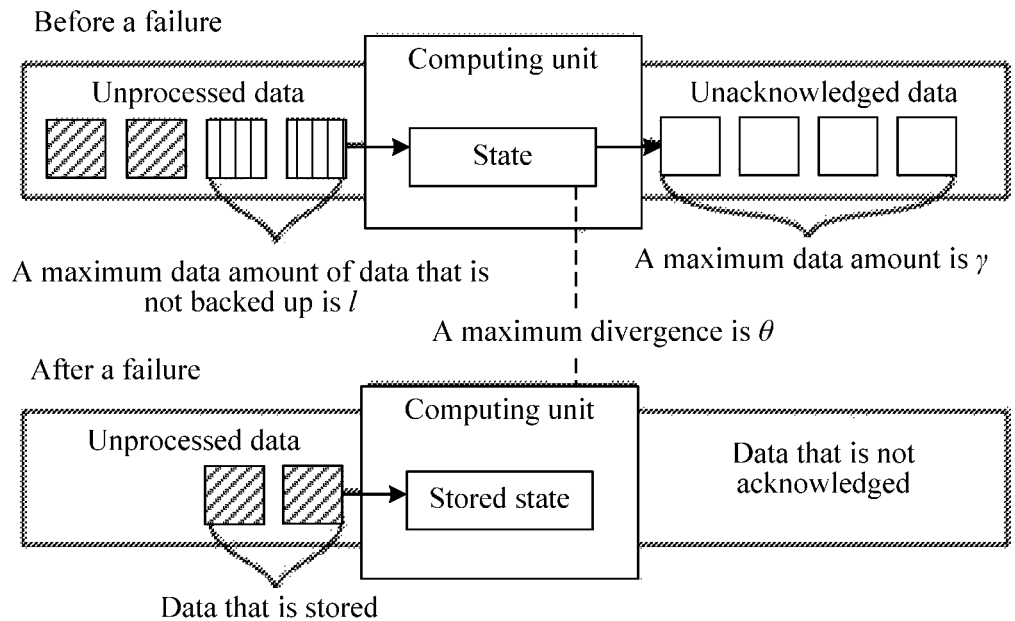
FIG. 9
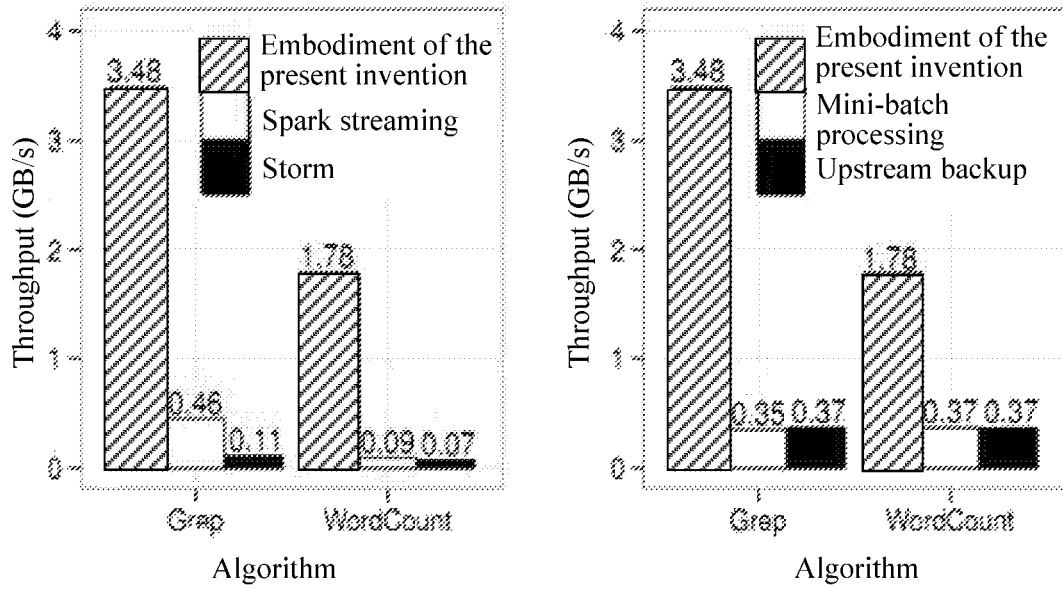
FIG. 10
FIG. 11

DATA PROCESSING METHOD AND APPARATUS

CROSS-REFERENCE TO RELATED APPLICATIONS

This application is a continuation of International Application No. PCT/CN2017/089671, filed on Jun. 23, 2017, which claims priority to Chinese Patent Application No. 201610616360.3, filed on Jul. 28, 2016. The disclosures of the aforementioned applications are hereby incorporated by reference in their entirety.

TECHNICAL FIELD

This application relates to the computing field, and more specifically, to a data processing method and apparatus.

BACKGROUND

With the rapid development of mobile broadband (MBB) and the Internet of Things (IoT), the world's data and information increase explosively. Statistics from a consulting company show that rapid growth of data and information far prevails over improvement of a storage capability of a computing device. Furthermore, related scholars also point out that value of the data and information rapidly declines as analysis time increases.

In a conventional data analysis mode, all original data and information are first stored, and then the data and information are analyzed. Storage overheads of the original data and information are excessively high, and time spent on data storage greatly affects data value. Therefore, big data stream processing (Big Data Stream Processing) gradually becomes one of core technologies in a data analysis field in the future.

In comparison with big data offline batch processing, the big data stream processing usually considers data as a continuous data stream, and processes each data tuple in the data stream in real time. For scalability, a distributed stream processing system may be further used to process the data. Distributed stream processing uses a distributed system and memory technology, to process and analyze in real time data that arrives continuously. Multiple threads or servers may process multiple data tuples in parallel.

In a programming paradigm of the distributed stream processing, data usually passes through the system only once. To perform high-speed and efficient processing and analysis, the distributed stream processing system usually uses unreliable volatile storage space (for example, a memory) for both processing and storage. In this process, original data is not stored and cannot be obtained again after being processed. This cannot ensure system reliability, and affects correctness of a data processing result.

To improve the system reliability, upstream backup is used in an existing solution. Specifically, after sending data to a downstream computing unit, an upstream computing unit that serves as a data sender-side persistently backs up the sent data into a distributed memory or hard disk (including a Hadoop distributed file system (HDFS)), and clears a buffer of the upstream computing unit according to a requirement after the downstream computing unit completes processing and feeds back acknowledgement (ACK) information. In the upstream backup solution, all data is backed up, and reliability is high. However, a large quantity of computing and storage resources are consumed in a storage process, and a processing speed of the downstream computing unit constrains processing of the upstream computing unit. When a failure occurs on the downstream computing unit, operation of the upstream computing unit is affected during fault tolerance. In conclusion, in the upstream backup solution, data processing efficiency of the distributed stream processing system is low.

SUMMARY

This application provides a data processing method and apparatus, so as to efficiently use a processing capability of a system, and improve an overall throughput rate of the system.

According to a first aspect, this application provides a data processing method. The method includes: receiving, by a first computing unit, first receive data sent by a second computing unit, where the second computing unit is upstream of the first computing unit; selectively and persistently backing up, by the first computing unit, the first receive data into a persistence backup device; performing, by the first computing unit, computing processing on the first receive data, to generate multiple pieces of first state information and first send data, where the multiple pieces of first state information are used to indicate multiple first intermediate states formed in a process of performing the computing processing on the first receive data, each piece of first state information in the multiple pieces of first state information includes an intermediate result obtained in the process of performing the computing processing on the first receive data, and the first send data is data formed after the computing processing on the first receive data is completed; selectively and persistently backing up, by the first computing unit, the multiple pieces of first state information into the persistence backup device; and sending, by the first computing unit, the first send data to a third computing unit, where the third computing unit is downstream of the first computing unit.

The data processing method of the first aspect is a downstream backup method, in which selective persistence backup is performed on data and first state information. This can improve backup efficiency and reduce a total backup amount of data and first state information. In this way, a processing capability of a system can be used more efficiently, and an overall throughput rate of the system can be improved.

In a possible implementation of the first aspect, the selectively and persistently backing up, by the first computing unit, the first receive data into a persistence backup device includes: making, by the first computing unit, a selection from the first receive data according to a user-defined data backup rule, and backing up selected first receive data into the persistence backup device; and the selectively and persistently backing up, by the first computing unit, the multiple pieces of first state information into the persistence backup device includes: making, by the first computing unit, a selection from the multiple pieces of first state information according to a user-defined state backup rule, and backing up selected first state information into the persistence backup device. In this implementation, a selective persistence backup rule is opened to a user, and the user defines the data backup rule and/or the state backup rule. This can further improve the backup efficiency.

In a possible implementation of the first aspect, after the receiving, by a first computing unit, first receive data sent by a second computing unit, the method further includes: buffering, by the first computing unit, the first receive data in a receive buffer of the first computing unit; the selectively and persistently backing up, by the first computing unit, the first receive data into a persistence backup device includes: if an amount of data buffered in the receive buffer of the first computing unit is greater than a preset first threshold, persistently backing up, by the first computing unit, a first part of data over the first threshold in the first receive data into the persistence backup device; and the selectively and persistently backing up, by the first computing unit, the multiple pieces of first state information into the persistence backup device includes: if a divergence between a target intermediate result in target state information in the multiple pieces of first state information and a latest intermediate result in latest state information stored in the persistence backup device at a current moment is greater than a preset second threshold, persistently backing up, by the first computing unit, the target state information into the persistence backup device, where the target state information is any first status information in the multiple pieces of first state information. In this implementation, backup thresholds are set for data and first state information. This can further improve the backup efficiency, reduce the total backup amount of data and first state information, and improve the overall throughput rate of the system.

In this implementation, the method may further include: decreasing, by the first computing unit, a value of the first threshold and a value of the second threshold if a preset quantity or more of failures occur on the first computing unit within a preset time period. This solution can prevent a cumulative effect caused because of multiple failures of a same computing unit, and prevent the computing unit from severely affecting overall performance and efficiency of the system.

In a possible implementation of the first aspect, before the receiving, by a first computing unit, first receive data sent by a second computing unit, the method further includes: receiving, by the first computing unit, recovery indication information sent by a controller, where the recovery indication information is used to instruct the first computing unit to substitute for a faulty fourth computing unit for operation; and obtaining, by the first computing unit, the stored latest state information from the persistence backup device; and when the first computing unit determines, according to the latest state information, that the first computing unit needs to obtain data from the second computing unit, the receiving, by a first computing unit, first receive data sent by a second computing unit includes: obtaining, by the first computing unit, the first receive data from the second computing unit according to the latest state information; or when the first computing unit determines, according to the latest state information, that the first computing unit needs to obtain data from the persistence backup device, the method further includes: obtaining, by the first computing unit, persistently backed-up second receive data from the persistence backup device according to the latest state information; performing, by the first computing unit, the computing processing on the second receive data, to generate multiple pieces of second state information and second send data, where the multiple pieces of second state information are used to indicate multiple second intermediate states formed in a process of performing the computing processing on the second receive data, each piece of second status information in the multiple pieces of second state information includes an intermediate result obtained in the process of performing the computing processing on the second receive data, and the second send data is data formed after the computing processing on the second receive data is completed; selectively and persistently backing up, by the first computing unit, the multiple pieces of second state information into the persistence backup device; and sending, by the first computing unit, the second send data to the third computing unit. This implementation provides a processing method for a failure of a computing unit, that is, fault-tolerance processing.

In a possible implementation of the first aspect, before the first computing unit completes the computing processing on the first receive data, the method further includes: feeding back, by the first computing unit, acknowledgement information to the second computing unit, where the acknowledgement information is used to instruct the second computing unit to delete, according to the acknowledgement information, the first receive data buffered in the second computing unit. In this implementation, a downstream computing unit performs data backup, and the downstream computing unit can feed back acknowledgement information to an upstream computing unit before computing processing is completed, to instruct the upstream computing unit to delete corresponding data in a buffer. Buffer space can be freed up in time, and a speed at which the upstream computing unit frees up space, and receives and processes new data can be increased, so that the processing capability of the system is used more efficiently, and the overall throughput rate of the system can be improved.

In a possible implementation of the first aspect, the method further includes: obtaining, by the first computing unit, third send data, and buffering the third send data in the receive buffer of the first computing unit, where the third send data is data formed after the third computing unit performs the computing processing; and performing the computing processing on the first receive data by using the third send data as the first receive data. In this implementation, a one-hop feedback can be implemented in data processing, so that data processed by the downstream computing unit in the computing units can be fed back to a previous-hop computing unit. Then, data analysis of iterative calculation can be effectively supported by analyzing and abstracting an existing iterative algorithm.

According to a second aspect, this application further provides a data processing apparatus, which is a computing unit. The computing unit may be a first computing unit and include a receiving module, a first computing module, a sending module, and a selective backup module, so as to complete the data processing method of the first aspect and the corresponding implementations of the first aspect in this application. The first computing unit of the second aspect may further include at least one of a receive buffer, a processing module, a fault tolerance module, or a feedback module, so as to complete the method in the corresponding implementations of the first aspect. Details are not described herein.

According to a third aspect, this application provides a data processing method. The method includes: receiving, by a first computing unit, first receive data sent by a second computing unit, where the second computing unit is upstream of the first computing unit; performing, by the first computing unit, computing processing on the first receive data, to generate multiple pieces of first state information and first send data, where the multiple pieces of first state information are used to indicate multiple first intermediate states formed in a process of performing the computing processing on the first receive data, each piece of first state information in the multiple pieces of first state information includes an intermediate result obtained in the process of performing the computing processing on the first receive data, and the first send data is data formed after the computing processing on the first receive data is completed; selectively and persistently backing up, by the first computing unit, the first send data and the multiple pieces of first state information into a persistence backup device; and sending, by the first computing unit, the first send data to a third computing unit, where the third computing unit is downstream of the first computing unit.

The data processing method of the third aspect is an upstream backup method, in which selective persistence backup is performed on data and first state information. This can improve backup efficiency and reduce a total backup amount of data and first state information. In this way, a processing capability of a system can be used more efficiently, and an overall throughput rate of the system can be improved.

In a possible implementation of the third aspect, the selectively and persistently backing up, by the first computing unit, the first send data and the multiple pieces of first state information into a persistence backup device includes: making, by the first computing unit, a selection from the first send data according to a user-defined data backup rule, and backing up selected first send data into the persistence backup device; and making, by the first computing unit, a selection from the multiple pieces of first state information according to a user-defined state backup rule, and backing up selected first state information into the persistence backup device.

In a possible implementation of the third aspect, after the first computing unit completes the computing processing on the first receive data and obtains the first send data, the method further includes: buffering, by the first computing unit, the first send data in a send buffer of the first computing unit; and the selectively and persistently backing up, by the first computing unit, the first send data and the multiple pieces of first state information into a persistence backup device includes: if an amount of data buffered in the send buffer of the first computing unit is greater than a preset third threshold, persistently backing up, by the first computing unit, a first part of data over the third threshold in the first send data into the persistence backup device; and if a divergence between a target intermediate result in target state information in the multiple pieces of first state information and a latest intermediate result in latest state information stored in the persistence backup device at a current moment is greater than a preset fourth threshold, persistently backing up, by the first computing unit, the target state information into the persistence backup device, where the target state information is any first status information in the multiple pieces of first state information.

In a possible implementation of the third aspect, the method further includes: decreasing, by the first computing unit, a value of the third threshold and a value of the fourth threshold if a preset quantity or more of failures occur on the first computing unit within a preset time period.

In a possible implementation of the third aspect, before the receiving, by a first computing unit, first receive data sent by a second computing unit, the method further includes: receiving, by the first computing unit, recovery indication information sent by a controller, where the recovery indication information is used to instruct the first computing unit to substitute for a faulty fourth computing unit for operation; and obtaining, by the first computing unit, the stored latest state information from the persistence backup device; and when the first computing unit determines, according to the latest state information, that the first computing unit needs to obtain data from the second computing unit, the receiving, by a first computing unit, first receive data sent by a second computing unit includes: obtaining, by the first computing unit, the first receive data from the second computing unit according to the latest state information; or when the first computing unit determines, according to the latest state information, that the first computing unit needs to obtain data from the persistence backup device, the method further includes: obtaining, by the first computing unit, persistently backed-up second receive data from the persistence backup device according to the latest state information; performing, by the first computing unit, the computing processing on the second receive data, to generate multiple pieces of second state information and second send data, where the multiple pieces of second state information are used to indicate multiple second intermediate states formed in a process of performing the computing processing on the second receive data, each piece of second status information in the multiple pieces of second state information includes an intermediate result obtained in the process of performing the computing processing on the second receive data, and the second send data is data formed after the computing processing on the second receive data is completed; selectively and persistently backing up, by the first computing unit, the multiple pieces of second state information into the persistence backup device; and sending, by the first computing unit, the second send data to the third computing unit.

For beneficial effects of the possible implementations of the third aspect, refer to beneficial effects of the corresponding implementations of the first aspect. Details are not described herein.

According to a fourth aspect, this application further provides a data processing apparatus, which is a computing unit. The computing unit may be a first computing unit and include a receiving module, a first computing module, a sending module, and a selective backup module, so as to complete the data processing method of the third aspect and the corresponding implementations of the third aspect in this application. The first computing unit of the fourth aspect may further include at least one of a send buffer, a processing module, or a fault tolerance module, so as to complete the method in the corresponding implementations of the third aspect. Details are not described herein.

According to a fifth aspect, this application further provides a data processing method. The method includes: receiving, by a first computing unit, first receive data sent by a second computing unit, and buffering the first receive data in a receive buffer of the first computing unit, where the second computing unit is upstream of the first computing unit; persistently backing up, by the first computing unit, the first receive data into a persistence backup devise; feeding back, by the first computing unit, acknowledgement information to the second computing unit, where the acknowledgement information is used to instruct the second computing unit to delete, according to the acknowledgement information, the first receive data buffered in the second computing unit; performing, by the first computing unit, computing processing on the first receive data, to generate first send data, where the first send data is data formed after the computing processing on the first receive data is completed; buffering, by the first computing unit, the first send data in a send buffer of the first computing unit; and sending the first send data to a third computing unit, where the third computing unit is downstream of the first computing unit.

According to the data processing method of the fifth aspect, a downstream computing unit performs data backup, and the downstream computing unit can feed back acknowledgement information to an upstream computing unit before computing processing is completed, to instruct the upstream computing unit to delete corresponding data in a buffer. Buffer space can be freed up in time, and a speed at which the upstream computing unit frees up space, and receives and processes new data can be increased, so that a processing capability of a system is used more efficiently, and an overall throughput rate of the system can be improved.

In a possible implementation of the fifth aspect, the persistently backing up, by the first computing unit, the first receive data into a persistence backup devise includes: if an amount of data buffered in the receive buffer of the first computing unit is greater than a preset first threshold, persistently backing up, by the first computing unit, a first part of data over the first threshold in the first receive data into the persistence backup device; and the method further includes: generating multiple pieces of first state information in a process of performing the computing processing on the first receive data, where the multiple pieces of first state information are used to indicate multiple first intermediate states formed in the process of performing the computing processing on the first receive data, and each piece of first state information in the multiple pieces of first state information includes an intermediate result obtained in the process of performing the computing processing on the first receive data; and if a divergence between a target intermediate result in target state information in the multiple pieces of first state information and a latest intermediate result in latest state information stored in the persistence backup device at a current moment is greater than a preset second threshold, persistently backing up, by the first computing unit, the target state information into the persistence backup device, where the target state information is any first status information in the multiple pieces of first state information. In this implementation, backup thresholds are set for data and first state information. This can further improve backup efficiency, reduce a total backup amount of data and first state information, and improve the overall throughput rate of the system.

In a possible implementation of the fifth aspect, the method further includes: decreasing, by the first computing unit, a value of the first threshold and a value of the second threshold if a preset quantity or more of failures occur on the first computing unit within a preset time period. This implementation can prevent a cumulative effect caused because of multiple failures of a same computing unit, and prevent the computing unit from severely affecting overall performance and efficiency of the system.

In another possible implementation of the fifth aspect, the persistently backing up, by the first computing unit, the first receive data into a persistence backup devise includes: persistently backing up, by the first computing unit, all of the first receive data into the persistence backup device. In this implementation, all receive data is persistently backed up, so that system reliability can be ensured to a largest extent.

In another possible implementation of the fifth aspect, before the receiving, by a first computing unit, first receive data sent by a second computing unit, and buffering the first receive data in a receive buffer of the first computing unit, the method further includes: receiving, by the first computing unit, recovery indication information sent by a controller, where the recovery indication information is used to instruct the first computing unit to substitute for a faulty fourth computing unit for operation; obtaining, by the first computing unit, the stored latest state information from the persistence backup device; and when the first computing unit determines, according to the latest state information, that the first computing unit needs to obtain data from the second computing unit, the receiving, by a first computing unit, first receive data sent by a second computing unit includes: obtaining, by the first computing unit, the first receive data from the second computing unit according to the latest state information; or when the first computing unit determines, according to the latest state information, that the first computing unit needs to obtain data from the persistence backup device, the method further includes: obtaining, by the first computing unit, persistently backed-up second receive data from the persistence backup device according to the latest state information; performing, by the first computing unit, the computing processing on the second receive data, to generate second send data, where the second send data is data formed after the computing processing on the second receive data is completed; buffering, by the first computing unit, the second send data in a send buffer of the first computing unit; and sending the second send data to the third computing unit.

In a possible implementation of the fifth aspect, the method further includes: obtaining, by the first computing unit, third send data, and buffering the third send data in the receive buffer of the first computing unit, where the third send data is data formed after the third computing unit performs the computing processing; and performing the computing processing on the first receive data by using the third send data as the first receive data. In this implementation, a one-hop feedback can be implemented in data processing, so that data processed by the downstream computing unit in the computing units can be fed back to a previous-hop computing unit. Then, data analysis of iterative calculation can be effectively supported by analyzing and abstracting an existing iterative algorithm.

According to a sixth aspect, this application further provides a data processing apparatus, which is a computing unit. The computing unit may be a first computing unit and include a receiving module, a first receive buffer, a first computing module, a first send buffer, a sending module, a feedback module, and a data backup module, so as to complete the data processing method of the fifth aspect. The first computing unit of the sixth aspect may further include at least one of a processing module or a fault tolerance module, so as to complete the method of the corresponding implementations of the fifth aspect. Details are not described herein.

According to a seventh aspect, this application further provides a computing unit. The computing unit may be a first computing unit and include an input interface, an output interface, a processor, and a storage, where the input interface is configured to obtain data from an upstream computing node; the storage is configured to buffer data and to be coupled to the processor, so as to store a necessary program instruction and data; the processor is configured to complete corresponding processing such as data backup and calculation; and the output interface is configured to send data to a downstream computing unit. The first computing unit is configured to complete the data processing method of the aspects in this application; and a function of a corresponding component of the computing unit of the seventh aspect may be corresponding to a function of a corresponding module of the first computing unit of the second aspect, the fourth aspect, or the sixth aspect. Details are not described herein.

According to an eighth aspect, this application further provides a data processing apparatus, which is a data processing system. The data processing system may include a controller, a persistence backup device, a data source node, an output destination node, and at least one first computing unit, so as to complete the data processing method of the aspects in this application.

It should be understood that the first computing unit in this application may be a computing unit of multiple granularities, for example, may be a worker node or a compute process.

This application provides definitions of a distributed stream processing system and an API of a processing procedure. This can greatly facilitate implementation of a standardized and unified design of real-time big data stream processing, thereby bringing great convenience to application deployment and dynamic user adjustment and control.

Receiving the first receive data sent by the second computing unit may be implemented by invoking a data receiving application programming interface API. Selectively and persistently backing up the first receive data into the persistence backup device may be implemented by invoking a selective backup function. Selectively and persistently backing up the multiple pieces of first state information into the persistence backup device may also be implemented by invoking the selective backup function. Performing the computing processing on the first receive data may be implemented by invoking a data processing API. Sending the first send data to the third computing unit may be implemented by invoking a data sending API. The selective backup function may include a data backup API, a state backup API, and a state divergence comparison API, to separately implement the corresponding methods of the first aspect. Decreasing the value of the first threshold and the value of the second threshold may be implemented by invoking a threshold adjustment API. During fault-tolerance processing, a state obtaining API and a data obtaining API may further be invoked to implement the corresponding methods of the first aspect. Feeding back the acknowledgement information to the second computing unit may be implemented by invoking a response feedback API.

BRIEF DESCRIPTION OF DRAWINGS

FIG. 9 is a schematic diagram of an error analysis according to an embodiment of this application;

FIG. 10 and FIG. 11 are schematic diagrams of performance comparison between a solution in an embodiment of this application and a conventional open-source solution;

DESCRIPTION OF EMBODIMENTS

Figure 1:
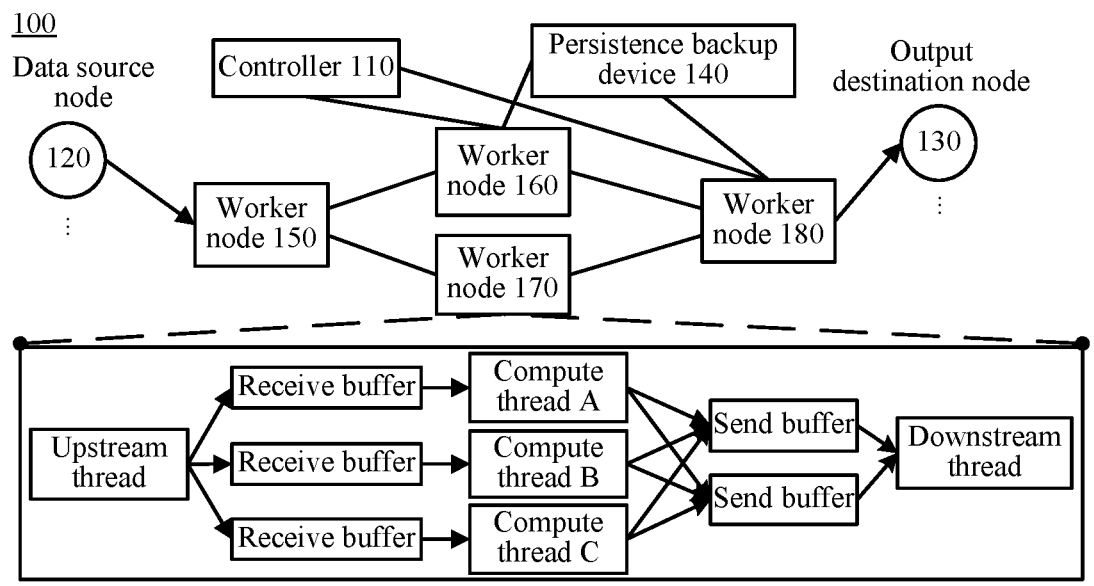
FIG. 1 is a schematic architectural diagram of a distributed stream processing system.

The following describes the technical solutions of this application with reference to the accompanying drawings.

Failures at various levels may occur in any process of a distributed stream processing system at any time. Therefore, it is crucial to ensure high reliability of the distributed stream processing system. In addition, performance and reliability of the system are usually two contradictory dimensions. How to ensure high reliability on the premise that the performance of the system and analysis accuracy are least affected or not affected at all is currently a hotspot and focus in a global research field. It is well-known that a common method for improving reliability is backup. All existing backup solutions attempt to ensure both high system reliability and analysis accuracy, but all have many adverse effects, especially during stream analysis for big data.

An existing common backup solution is a hot backup solution. When a failure occurs, data is recovered by means of active/standby switchover. Hot backup is mainly used in a stream database architecture and is backup performed when a system is in a normal running state. Hot backup and active/standby switchover solutions require a large amount of storage space, and double resources usually need to be introduced. Because of excessive overheads, the hot backup and active/standby switchover solutions are difficult to implement during deployment and high-performance analysis of an actual distributed stream processing system.

Another existing common backup solution is an upstream backup solution. Specifically, after sending data to a downstream computing unit, an upstream computing unit that serves as a data sender-side persistently backs up the sent data into a distributed memory or hard disk (including an HDFS), and clears a buffer of the upstream computing unit according to a requirement after the downstream computing unit completes processing and feeds back ACK information.

For example, MillWheel, a large-scale distributed low-latency streaming data processing architecture of Google (Google), provides a set of interfaces to store state information and data. MillWheel uses an upstream backup solution, in which state changes are all stored in BigTable. When a failure occurs, latest states and data that are stored in BigTable are re-sent for use in fault tolerance. During the fault tolerance, latest state information usually needs to be obtained from BigTable, so as to obtain data from BigTable or an upstream computing unit according to the state information.

In the upstream backup solution, all data is backed up, and reliability is high. However, overheads of computing and storage resources are increased in a storage process, and data in a send buffer of the upstream computing unit can be deleted only after the downstream computing unit completes processing. That is, a processing speed of the downstream computing unit constrains processing of the upstream computing unit, affects new data processing and output of the upstream computing unit, and reduces pipeline processing efficiency. When a failure occurs on the downstream computing unit, data needs to be re-sent from the upstream computing unit during fault tolerance, affecting operation of the upstream computing unit. In conclusion, in the upstream backup solution, data processing efficiency of the distributed stream processing system is low.

It should be understood that upstream in this specification refers to a data processing stage earlier than a reference point in a stream processing process, and downstream refers to a data processing stage later than the reference point in the stream processing process. For example, for a stream processing pipeline A→B→C . . . , A is upstream of B, B is upstream of C, B is downstream of A, and C is downstream of B.

The following describes a composition of a distributed stream processing system. FIG. 1 is a schematic architectural diagram of a distributed stream processing system 100. Referring to FIG. 1, the distributed stream processing system 100 is described separately from two levels: a server level (server level) and a thread level (thread level). The distributed stream processing system 100 has a distributed capability and a parallel processing capability.

From the server level, the distributed stream processing system 100 includes the following key entities: a controller (controller) 110, a persistence backup device 140 which may also be referred to as a backup server (backup server), a data source node 120, an output destination node 130, and at least one computing unit. The computing unit may be, for example, a worker (worker) node shown in FIG. 1.

The controller 110 is configured to: manage and maintain computing units, find a faulty computing unit, and send recovery indication information to a substitute computing unit that substitutes for the faulty computing unit, to instruct the substitute computing unit to substitute for the faulty computing unit to perform computing processing. That is, the controller 110 coordinately manages and maintains all the computing units and is responsible for fault-tolerant management. The computing unit periodically sends heartbeat information to the controller 110. The controller 110 receives the heartbeat information and performs heartbeat detection on the computing unit. Once the heartbeat detection fails, the controller 110 enables a new computing unit to perform state and data recovery. Therefore, all the computing units can communicate with the controller. For clarity, FIG. 1 merely shows an example in which a worker node 160 and a worker node 180 (two computing units) communicate with the controller.

The data source node 120 is configured to send to-be-processed data to a most-upstream computing unit in the computing units.

The output destination node 130 is configured to receive data that is formed after the computing processing is completed and that is sent by a most-downstream computing unit in the computing units.

The computing unit (for example, a worker node shown in FIG. 1) is configured to manage stream processing or an operator (operator) of an algorithm, and is responsible for writing persistent state information and data into the backup server for backup.

It should be understood that the distributed stream processing system usually includes multiple computing units. FIG. 1 shows an example of four worker nodes: a worker node 150, the worker node 160, a worker node 170, and the worker node 180. A quantity of worker nodes in FIG. 1 is merely an example, but not a limitation. The distributed stream processing system 100 may include any quantity of worker nodes.

The persistence backup device 140 is configured to store data or state information that is generated when a computing module in the computing unit performs the computing processing. That is, the backup server is configured to: receive the state information and the data that are written by the computing unit, perform persistence storage, and provide the state information and the data during fault tolerance. All the computing units can also communicate with the persistence backup device. For clarity, FIG. 1 merely shows an example in which the worker node 160 and the worker node 180 communicate with the persistence backup device.

In the existing upstream backup and fault tolerance solutions, a distributed stream processing function may be indicated and connected by using a directed acyclic graph (directed acyclic graph). In graph theory, if there is no way to start from a vertex and follow several edges to return to the vertex in a directed graph, this graph is a directed acyclic graph. It may be understood that in an existing conventional distributed stream processing system, data processing is directed, and iterative calculation cannot be supported between the computing units. Therefore, only a processing process of the directed acyclic graph is supported.

In a data processing system in the embodiments of this application, a one-hop feedback (one-hop feedback) can be implemented, so that data processed by a downstream computing unit in multiple computing units can be fed back to a previous-hop computing unit. Then, data analysis of iterative calculation can be effectively supported by analyzing and abstracting an existing iterative algorithm. Therefore, a processing process in a data processing method and the data processing system in the embodiments of this application may be corresponding to an undirected graph (undirected graph), and how to implement iterative calculation in the embodiments of this application is to be described below in detail.

From the thread level, any worker node (for example, the worker node 170) includes three types of threads, which are an upstream thread (upstream thread), a compute thread (compute thread), and a downstream thread (downstream thread), respectively. Each compute thread is corresponding to a receive buffer and a send buffer. The receive buffer is configured to buffer to-be-processed data that is received. The send buffer is configured to buffer to-be-sent data that has been processed. The threads are briefly and generally described herein, and are to be described in detail in the embodiments of this application described below.

The upstream thread is used to: receive data from a send buffer of an upstream worker node or from the data source node, and allocate the received data to the compute thread for computing processing. In addition, the upstream thread has a capability of feeding back a calculation result to the upstream worker node. In conclusion, the upstream thread is a thread used by a worker node to obtain data from another worker node or the data source node and feed back related information.

The downstream thread is used to send data processed by the compute thread to another worker node or the output destination node. In addition, the downstream thread has a capability of feeding back a result to the compute thread. In conclusion, the downstream thread is a thread used by a worker node to send data to another worker node or the output destination node and feed back related information.

Multiple compute threads (FIG. 1 shows an example of a compute thread A, a compute thread B, and a compute thread C) are used to process input data in parallel or in a cascaded pipelining manner, to generate output data and state information. That is, compute threads of a worker node may be in a parallel form or in a serial form, and compute threads in some distributed stream processing systems may also be compute processes or other computing modules. This is not limited in the embodiments of this application. The compute threads may implement a same function during the parallel processing, that is, the parallel compute threads may use a same algorithm to process different data. Alternatively, the compute threads may implement different functions during the parallel processing, that is, the parallel compute threads may use different algorithms for processing, and multiple algorithms or multiple processings are performed simultaneously.

It should be understood that the computing unit may have multiple granularities. For example, the computing unit may be a worker node. The worker node includes a receive buffer and a send buffer that are configured to buffer received data and to-be-sent data, respectively, and the worker node includes a compute thread that is used to perform computing processing. For another example, alternatively, the computing unit may be a compute process. The compute process also includes a receive buffer and a send buffer, and the compute process includes a computing module that is configured to perform computing processing. That is, the computing unit may include an operator, a compute thread, or a module used for calculation. The operator, the compute thread, or the module used for calculation is uniformly referred to as a computing module. The computing unit may further include a receive buffer and a send buffer that are corresponding to the computing module. This is not limited in the embodiments of this application. A specific working procedure of the computing unit and an entity and a module included in the computing unit are to be described below in detail.

In the foregoing distributed stream processing system 100, based on an approximation fault-tolerance solution design, each computing unit may include the following modules: a state backup module, configured to persistently back up information related to an intermediate state generated in a data processing process of the computing unit; and a data backup module, configured to persistently back up data. The computing unit may further include a fault tolerance module, configured to recover the system when a failure occurs on the computing unit.

It should be understood that the data processing system in the embodiments of this application may include the entities, the threads, or the modules in the foregoing distributed stream processing system 100, and a connection relationship between and quantities of the entities, the threads, and the modules in the data processing system are not limited to the foregoing description. In addition, the entities, the threads, and the modules may be physically deployed together in any appropriate form, or may be physically deployed separately. This is not limited in the embodiments of this application.

The following describes a data processing method 200 in an embodiment of this application in detail. The method 200 is performed by a computing unit, and is a downstream backup solution. In the method 200, behavior of a current first computing unit is mainly discussed. The first computing unit includes a first receive buffer (buffer) and a first send buffer. A second computing unit is upstream of the first computing unit, and the second computing unit is corresponding to a second receive buffer and a second send buffer. A third computing unit is downstream of the first computing unit, and the third computing unit is corresponding to a third receive buffer and a third send buffer.

Figure 2:
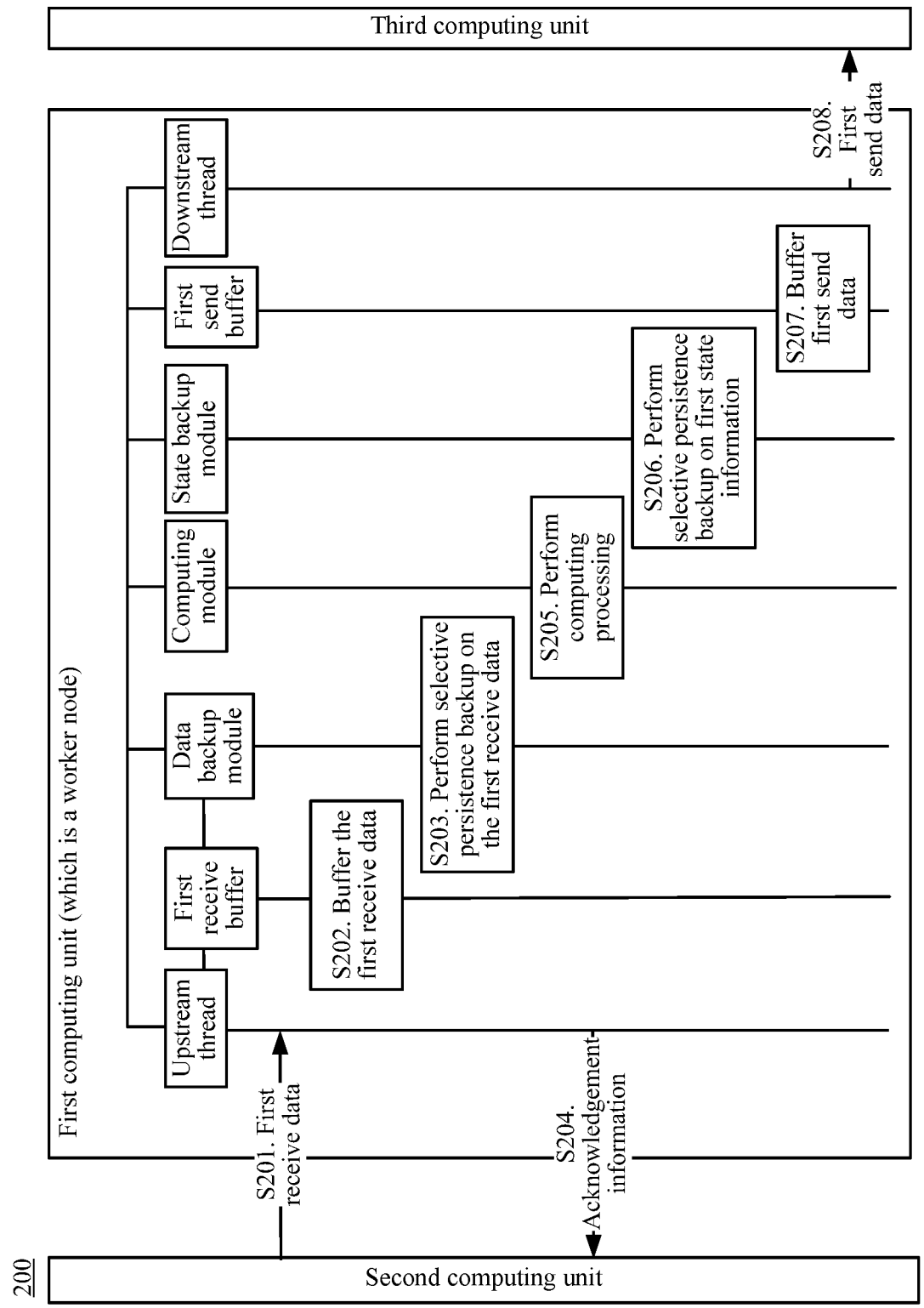
FIG. 2 is a schematic flowchart of a data processing method according to an embodiment of this application.

It should be understood that the foregoing three computing units may be worker nodes, compute processes, or the like. The three computing units may belong to a same physical entity, or may separately belong to different physical entities. For example, the three computing units are compute processes. The first computing unit belongs to a worker node, and the second computing unit and the third computing unit may belong to the worker node, or may not belong to the worker node. This is not limited in this embodiment of this application. The method 200 shown in FIG. 2 is described by using an example in which the computing units are worker nodes. The method 200 may include the following steps.

S201. Obtain first receive data. The first receive data is processed by the second computing unit and then sent by using the second send buffer. The second send buffer is configured to buffer to-be-sent data that has been processed by the second computing unit. That is, what is to be discussed is that the first computing unit obtains data from a send buffer (that is, the second send buffer) corresponding to an upstream computing unit (that is, the second computing unit). Certainly, the first computing unit may also obtain data from a data source node. This case is not discussed in this embodiment of this application.

In an embodiment of this application, when the computing unit is a worker node, the first computing unit may specifically obtain the data by using an upstream thread shown in FIG. 2.

In another embodiment of this application, the computing unit may be a compute process. The second computing unit may be a compute process of a worker node to which the first computing unit belongs, or may be a compute process of another worker node.

When the second computing unit is not the compute process of the worker node corresponding to the first computing unit, the data may be obtained by using an upstream process of the worker node corresponding to the first computing unit. When the second computing unit is the compute process of the worker node to which the first computing unit belongs, the data may be obtained by using a Transparent Inter-process Communication (TIPC) protocol or ZeroMQ (ZMQ). TIPC and ZMQ are data transmission pipelines inside a computer. TIPC is an inter-process communication manner, and ZMQ is an intra-process communication manner. Certainly, another communication manner may also be used for data transmission. This is not limited in this embodiment of this application.

In this embodiment of this application, the upstream thread, TIPC, or ZMQ that receives the first receive data sent by the second computing unit is uniformly referred to as a receiving module. Data receiving may be specifically implemented by the computing unit by invoking a data receiving application programming interface (API), for example, implemented by invoking a functional function ReceiveDataItem( ).

S202. Buffer the first receive data in the first receive buffer, where the first receive buffer belongs to the first computing unit, the first receive buffer is configured to buffer to-be-processed data that is allocated to the first computing unit, and the second computing unit is upstream of the first computing unit. Specifically, after receiving the data, the computing unit first buffers the data in the receive buffer before delivering the data to a computing module.

S203. Perform persistence backup processing on the first receive data. Specifically, in this embodiment of this application, a downstream backup manner, or referred to as receiver-side backup (receiver-side backup), is used. That is, after receiving and buffering the data, the current first computing unit performs the persistence backup processing on the data. The first computing unit serves as a downstream computing unit relative to the second computing unit. In this embodiment of this application, the persistence backup processing may be simply persistence backup of all data (that is, all of the first receive data) obtained by the worker node into a persistence backup device. Specifically, the persistence backup processing may be implemented by a data backup module.

In this embodiment of this application, alternatively, the persistence backup processing may be backup of a part of the obtained data, that is, selective persistence backup of the obtained data shown in FIG. 2. Specifically, selectively and persistently backing up, by the first computing unit, the first receive data into the persistence backup device may include: if an amount of data buffered in the first receive buffer is greater than a preset first threshold, persistently backing up a first part of data over the first threshold in the first receive data into the persistence backup device. Specifically, in distributed stream processing, analysis is mainly performed for a continuous data stream. Therefore, a processing capability, network bandwidth, and an input/output (Input/Output, I/O) capability of an entire distributed stream processing system are mainly consumed on data processing and backup. In this embodiment of this application, to improve data backup efficiency, a data backup operation is improved.

Figure 3:
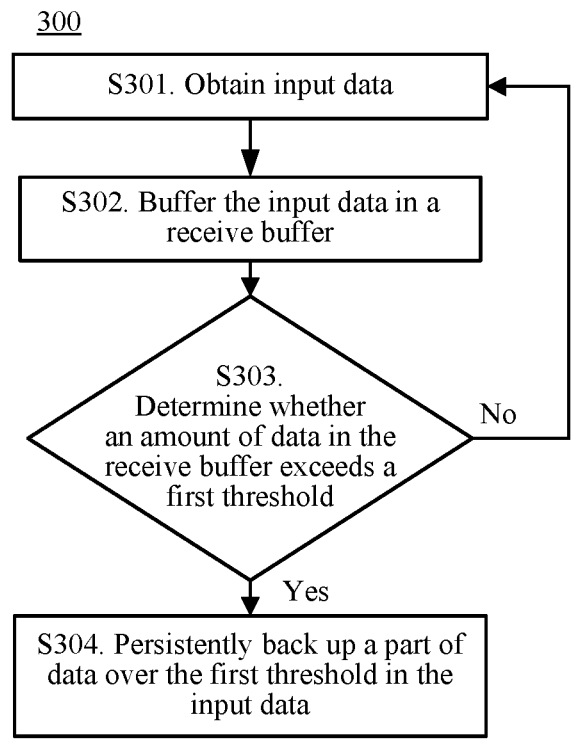
FIG. 3 is a schematic flowchart of data backup according to an embodiment of this application.

Steps in this embodiment, together with S201 and S202, may be considered as a data backup procedure and may be performed by the data backup module. FIG. 3 shows a schematic flowchart of data backup according to an embodiment of this application. As shown in FIG. 3, a data backup procedure 300 may include the following steps:

S301. Obtain input data, that is, obtain data from a send buffer of an upstream computing unit or from a data source node.

S302. Buffer the received input data in a receive buffer. Further, the input data may be sent to each computing module of a computing unit for computing processing. The computing processing and persistence backup may be performed simultaneously, so as to improve processing efficiency of a system. This is not limited in this embodiment of this application.

S303. Determine whether an amount of data in the receive buffer exceeds a first threshold. If yes, that is, the amount of data in the receive buffer is greater than the first threshold, S304 is performed; or otherwise, S301 continues to be performed.

S304. Persistently back up a part of data over the first threshold in the received input data.

In this embodiment of this application, the persistence backup processing may be performed by the data backup module. A specific form of the first threshold may be a data size, for example, a data amount of 1 GB, a quantity of data items (or referred to as a quantity of data tuples), or the like. This is not limited in this embodiment of this application. The first threshold may be preset by the system. The first threshold may be determined according to a determining criterion such as experience, a processing capability of the computing unit, or a data loss degree that is acceptable to the system when a failure occurs on the first computing unit. Alternatively, the first threshold may be modified, set, or defined by a user according to the user's need. To further improve the backup efficiency and reduce a total backup amount of data, the computing unit in this embodiment of this application may further perform selective backup according to data importance defined by the user.

In addition, selective persistence backup of data may not be implemented by setting a threshold. Alternatively, selectively and persistently backing up, by the first computing unit, the first receive data into the persistence backup device may be implemented in the following manner: making, by the first computing unit, a selection from the first receive data according to a user-defined data backup rule, and backing up selected first receive data into the persistence backup device. Certainly, the data backup rule may also be pre-defined by the system or set to a system default rule. This is not limited in this embodiment of this application. It should be understood that selective persistence backup of the first receive data is to reduce the total backup amount of data, and the selective persistence backup of the first receive data is not mandatory in some embodiments.

Selective backup of data may be specifically implemented by the computing unit by invoking a data backup API, for example, may be implemented by invoking a functional function BackupItem( ).

S204. After the first computing unit allocates the received data to a corresponding computing module, the first computing unit feeds back acknowledgement information to the second computing unit, where the acknowledgement information is used to instruct the second computing unit to delete, according to the acknowledgement information, the first receive data buffered in the second send buffer. It should be understood that step 204 is an improvement intended to instruct the upstream computing unit to delete the corresponding data in the buffer, so as to free up buffer space in time. Therefore, step 204 is not mandatory in some embodiments.

When the computing unit is the worker node, the acknowledgement information may be fed back by using the upstream thread shown in FIG. 2. The upstream thread is corresponding to a feedback module.

In another embodiment of this application, the computing unit may be a compute process. The second computing unit may be a compute process of the worker node to which the first computing unit belongs, or may be a compute process of another worker node. When the second computing unit is not the compute process of the worker node corresponding to the first computing unit, the acknowledgement information may be fed back by using the upstream process of the worker node corresponding to the first computing unit. The upstream thread is corresponding to the feedback module. When the second computing unit is the compute process of the worker node to which the first computing unit belongs, the acknowledgement information may be fed back by using TIPC or ZMQ. In this case, TIPC or ZMQ is corresponding to the feedback module. The acknowledgement information may be specifically fed back by the computing unit by invoking a response feedback API, for example, may be implemented by invoking a functional function SendFeedbackItem(Item & feedback).

Figure 4:
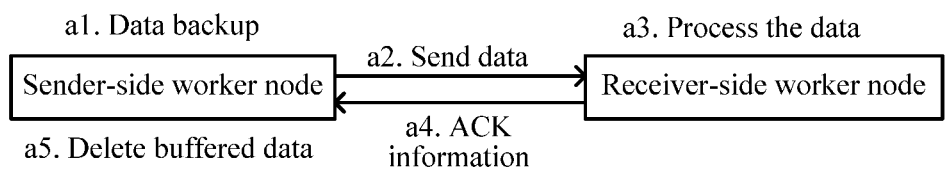
FIG. 4 is a schematic diagram of a conventional upstream backup solution.

Specifically, a main difference between the downstream backup solution in this embodiment of this application and a conventional upstream backup solution is as follows: As shown in FIG. 4, in the conventional upstream backup solution, an upstream computing unit (for example, a sender-side worker node) persistently backs up all sent data into a persistence backup device (for example, a distributed memory or hard disk), as shown in a1. Then, the upstream computing unit sends the data to a downstream computing unit (for example, a receiver-side worker node), as shown in a2. The downstream computing unit processes the data, as shown in a3. After completing the processing, the downstream computing unit feeds back ACK information to an upstream computing node, as shown in a4. After the downstream computing unit feeds back the ACK information to the upstream computing node, the upstream computing unit deletes buffered related data according to a requirement, as shown in a5.

On one hand, the upstream computing unit and a corresponding send buffer frequently back up a large amount of data (all data). On the other hand, buffer space cannot be freed up in time. This affects a speed at which the upstream computing unit receives and processes new data, and affects processing efficiency of an entire pipeline. During fault tolerance, the upstream computing unit and the corresponding send buffer need to be used to re-send data, to recover data and state information. This affects the upstream computing unit, and greatly reduces pipeline processing efficiency and performance.

Figure 5:
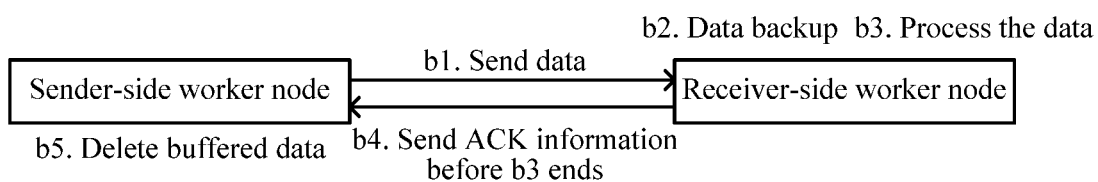
FIG. 5 is a schematic diagram of a downstream backup solution according to an embodiment of this application.
Figure 6:
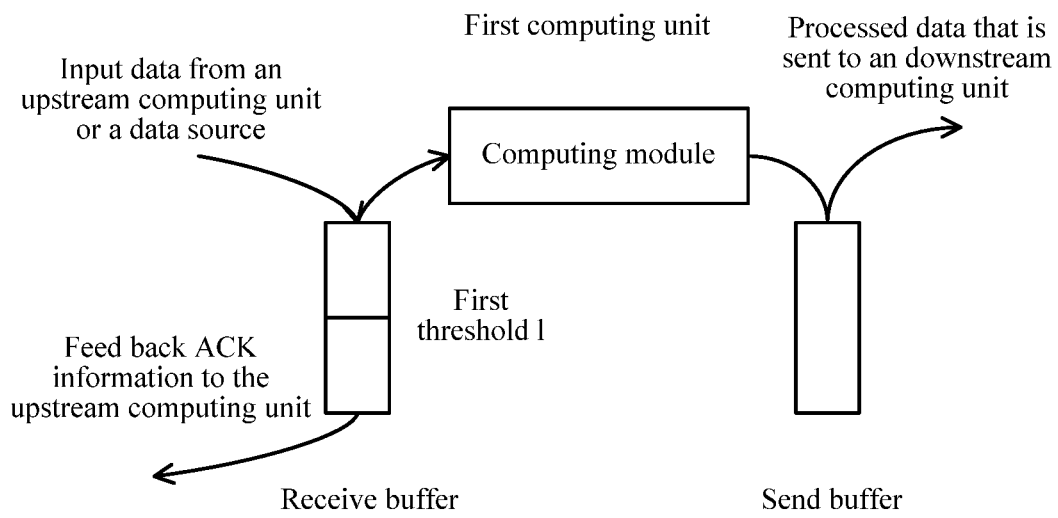
FIG. 6 is a schematic diagram of a downstream backup solution according to an embodiment of this application.

As shown in FIG. 5 and FIG. 6, in the downstream backup solution in this embodiment of this application, a receive buffer (buffer) of a current computing unit (that is, the first computing unit, for example, a receiver-side worker node) receives processed data that is output by an upstream computing unit (for example, a sender-side worker node) and uses the processed data as input data, as shown in b1. The current computing unit performs data backup and processes the data, as shown in b2 and b3. The current computing unit can feed back ACK information to the upstream computing unit before data processing is completed, as shown in b4. The upstream computing unit deletes corresponding data in a buffer, as shown in b5.

In this way, buffer space can be freed up in time, and a speed at which the upstream computing unit frees up space, and receives and processes new data is increased, so that a pipeline processing capability of a distributed stream processing system is used more efficiently, and an overall throughput rate of the system is improved.

As shown in FIG. 6, a specific implementation of the selective persistence backup of the first receive data may be as follows: The first threshold is set for the receive buffer (that is, the first receive buffer) of the first computing unit. After an amount of data buffered in the first receive buffer exceeds the first threshold, a part of data over the first threshold is persistently backed up. In this way, not all data needs to be backed up, but instead, storage is required only when the amount of data is greater than the first threshold. Therefore, a persistence storage frequency (I/O overheads) and an amount of stored data are reduced, and efficiency and performance in pipeline processing of the system can further be improved.

It should be understood that, in this embodiment of this application, a reason why the amount of data buffered in the first receive buffer exceeds the first threshold may be congestion of the computing unit, or there may be another reason. This is not limited in this embodiment of this application. Preferably, during persistence backup, backup information may be generated, to identify data that is backed up. For example, a data number, data content, or the like of the data that is backed up is recorded, to facilitate data search during subsequent fault tolerance.

S205. The first computing unit performs computing processing on the first receive data, to generate first send data and multiple pieces of first state information, where the first send data is data formed after the computing processing on the first receive data is completed, and the multiple pieces of first state information are used to indicate multiple first intermediate states formed in a process of performing the computing processing on the first receive data. The computing processing may be specifically completed by a compute thread. In this embodiment of this application, hardware or software performing the computing processing is uniformly referred to as a computing module. The computing processing may be specifically implemented by the computing unit by invoking a data processing API, for example, may be implemented by invoking a functional function ProcessData( ).

It should be understood that, the first state information in this embodiment of this application indicates an intermediate state of the first receive data that has been processed in each intermediate stage of the computing processing, and, for example, may include an intermediate processing result, a data number corresponding to the intermediate processing result, and the like, or may include other content. The first state information may be obtained at a specified processing interval, or may be obtained once each time a specified quantity of first receive data tuples are processed. This is not limited in this embodiment of this application.

S206. Persistently back up at least one piece of first status information in the multiple pieces of first status information. Specifically, N pieces of first state information in M pieces of first state information are persistently backed up, where M and N are positive integers, and N is less than or equal to M. Specifically, persistence backup of the first state information may be implemented by a state backup module.

Specifically, a specific implementation is to back up first state information obtained each time. In this case, N is equal to M.

In another specific implementation, the first state information includes an intermediate result obtained by processing the first receive data in a processing process. Persistently backing up the N pieces of first state information in the M pieces of first state information may include: determining, according to a preset second threshold and a divergence between a latest intermediate result in latest state information stored in the persistence backup device at a current moment and an intermediate result in each piece of first state information in the M pieces of first state information, whether each piece of first state information needs to be persistently backed up; performing persistence backup if it is required to persistently back up each piece of first state information; or skipping performing persistence backup if it is not required to persistently back up each piece of first state information. Finally, it is learned from a result that, the N pieces of first state information in the M pieces of first state information are persistently backed up. As shown in FIG. 2, this process may be considered as selective persistence backup of the first state information.

Figure 7:
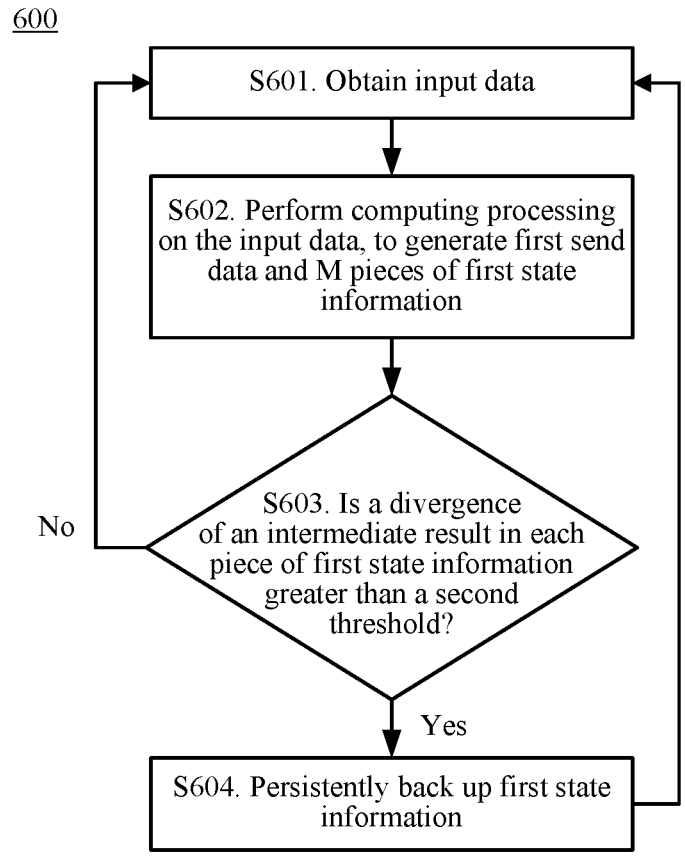
FIG. 7 is a schematic flowchart of state backup according to an embodiment of this application.

Steps in the following specific implementation, together with S201 and S205, may be considered as a state backup procedure and may be performed by the state backup module. FIG. 7 shows a schematic flowchart of state backup according to an embodiment of this application. As shown in FIG. 7, a state backup procedure 600 may include the following steps.

S601. Obtain input data, that is, obtain data from a send buffer of an upstream computing unit or from a data source node.

S602. Perform computing processing on first receive data, that is, the input data, to generate first send data and M pieces of first state information.

S603. Determine whether a divergence (divergence) between an intermediate result in each piece of first state information and a latest intermediate result in latest state information that is persistently backed up currently is greater than a second threshold. If yes, that is, the divergence is greater than the second threshold, S604 is performed; or otherwise, S601 continues to be performed.

S604. Persistently back up first state information with a divergence greater than the second threshold. Specifically, the first state information that is currently obtained is, for example, target state information. The target state information is any first state information in multiple pieces of first state information. It should be understood that a state divergence may be compared according to an algorithm or a function in the prior art or may be compared according to a specific user-defined calculation rule. This is not limited in this embodiment of this application. A divergence between a target intermediate result in the target state information and the latest intermediate result in the latest state information that is persistently backed up currently may be compared by invoking a functional function. For example, a state divergence comparison API (that is, a functional function StateDivergence( )) may be designed for divergence calculation. When the divergence is greater than the second threshold, a state backup API is invoked (that is, a functional function BackupState( ) is invoked). The current target state information is persistently backed up.

To further reduce a total backup data amount of first state information, a definition of the state divergence comparison API (invoking the functional function StateDivergence( )) may be opened to a user. That is, the user can specify an important stage in which backup needs to be performed, or the user can specify a weight for each intermediate result during divergence calculation. In addition, the user may further specify a value of the second threshold according to a need.

It should be understood that, in this embodiment of this application, the first state information is obtained step by step in the computing processing of the computing unit, and the multiple pieces of first state information may be obtained by means of processing at different moments during processing of the first receive data. The first state information obtained by means of processing at different moments represents different first intermediate states obtained by processing the first receive data in the processing process.

In a simple example, the first receive data is a 30-page article. The computing processing is to count frequency of occurrence of "user" in the foregoing article. The first state information includes at least two parts of content: one part is a current page number at which the article is being processed, and the other part is frequency of occurrence of "user" when the article is being processed at the page number. In a process of processing the first receive data, one piece of first status information in the multiple pieces of first status information may be that when five pages of the article have been processed, frequency of occurrence of "user" is 10; another piece of first status information in the multiple pieces of first state information may be that when 10 pages of the article have been processed, frequency of occurrence of "user" is 12; still another piece of first status information in the multiple pieces of first state information may be that when 15 pages of the article have been processed, frequency of occurrence of "user" is 21; and the like. There may be more pieces of first state information.

Assuming that latest state information that is currently persistently backed up is that when five pages of the article have been processed, frequency of occurrence of "user" is 10, a latest intermediate result is 10. It is assumed that the second threshold is 3. For the first state information "when 10 pages of the article have been processed, frequency of occurrence of 'user' is 12", a divergence between an intermediate result 12 and the latest intermediate result 10 that is persistently backed up is 2, which is less than the second threshold 3, and therefore the first state information "when 10 pages of the article have been processed, frequency of occurrence of 'user' is 12" is not persistently backed up. For the first state information "when 15 pages of the article have been processed, frequency of occurrence of 'user' is 21", a divergence between an intermediate result 21 and the latest intermediate result 10 that is persistently backed up is 11, which is greater than the second threshold 3, and therefore the first state information "when 15 pages of the article are processed, frequency of occurrence of 'user' is 21" is persistently backed up.

It should be understood that, usually, the intermediate result is not a simple form similar to "frequency" described in the foregoing example, but a complex vector or matrix or another form. In this case, a divergence between intermediate results also becomes complex, and is, for example, a divergence between each element of a vector or a divergence between each dimension of a matrix. In this embodiment of this application, a normalization means or the like may be used to simplify the divergence, or quantize the divergence, so that the divergence is measurable and can be compared with the second threshold. A specific processing means is not limited in this application.

In addition, the selective persistence backup of the first state information may not be implemented by setting a threshold. Selectively and persistently backing up, by the first computing unit, the multiple pieces of first state information into the persistence backup device may further be implemented in the following manner: making, by the first computing unit, a selection from the multiple pieces of first state information according to a user-defined state backup rule, and backing up the multiple pieces of first state information into the persistence backup device. Certainly, the state backup rule may also be pre-defined by the system or set to a system default rule. This is not limited in this embodiment of this application.

A state backup frequency and a total data amount can be reduced by performing the foregoing procedure of selectively and persistently backing up the first state information. It should be understood that the selective persistence backup of the first state information is to reduce a total backup amount of first state information, and the selective persistence backup of the first state information is not mandatory in some embodiments.

It should be noted that, in this embodiment of this application, a solution of setting the first threshold for the data backup procedure and a solution of setting the second threshold for the state backup procedure may be separately implemented. Preferably, setting the first threshold for the data backup procedure and setting the second threshold for the state backup procedure are performed simultaneously, so that data backup matches with state backup.

In this embodiment of this application, an objective of setting the first threshold and/or the second threshold is to reduce a frequency and a total data amount in a persistence backup operation of each computing unit by introducing a bounded error, so as to implement fault-tolerant management in distributed stream processing on the premise that the performance and analysis accuracy of the entire system are ensured as much as possible.

An optional embodiment of this application provides an approximation fault-tolerance processing solution in a distributed stream processing system, so as to perform persistence backup and distributed recovery based on a state divergence and different user-defined thresholds. In this way, not all data and all corresponding states after the data is processed are persistently backed up, but instead, a bounded error is introduced according to the user-defined thresholds, so as to reduce a frequency of backing up state information and data and balance performance, analysis accuracy, and high reliability of the system.

S207. Buffer the first send data in the first send buffer, and send the first send data to the third computing unit by using the first send buffer, where the third computing unit is downstream of the first computing unit. Until S207, the first computing unit completes processing of the first receive data.

In an embodiment of this application, when the computing unit is a worker node, the first send data may be sent by using a downstream thread shown in FIG. 2.

In another embodiment of this application, the computing unit may be a compute process. The third computing unit may be a compute process of the worker node to which the first computing unit belongs, or may be a compute process of another worker node. When the third computing unit is not the compute process of the worker node corresponding to the first computing unit, the data may be obtained by using a downstream process of the worker node corresponding to the first computing unit. When the third computing unit is the compute process of the worker node to which the first computing unit belongs, the first send data may be sent by using TIPC or ZMQ. Certainly, another communication manner may also be used for data transmission. This is not limited in this embodiment of this application. Data sending may be specifically implemented by the computing unit by invoking a data sending API, for example, may be implemented by invoking a functional function SendDataItem (Item & feedback).

The data processing method in this embodiment of this application may further implement iterative calculation. Specifically, the method 200 may further include: obtaining, by the first computing unit, third send data and buffering the third send data in the first receive buffer, where the third send data is data formed after the third computing unit performs the computing processing; and performing, by the first computing unit, the computing processing on the first receive data by using the third send data as the first receive data.

In this way, a one-hop feedback (one-hop feedback) can be implemented in data processing, so that data processed by the downstream computing unit in the computing units can be fed back to a previous-hop computing unit. Then, data analysis of the iterative calculation can be effectively supported by analyzing and abstracting an existing iterative algorithm.

The foregoing describes the data processing and backup procedures when the system is in a normal state. On this basis, when a failure occurs on a computing unit in the system, fault tolerance needs to be performed for the system, and may be performed by a fault tolerance module. A description is given based on a case in which a fourth computing unit fails and a new computing unit used to substitute for the fourth computing unit is the first computing unit.

Figure 8:
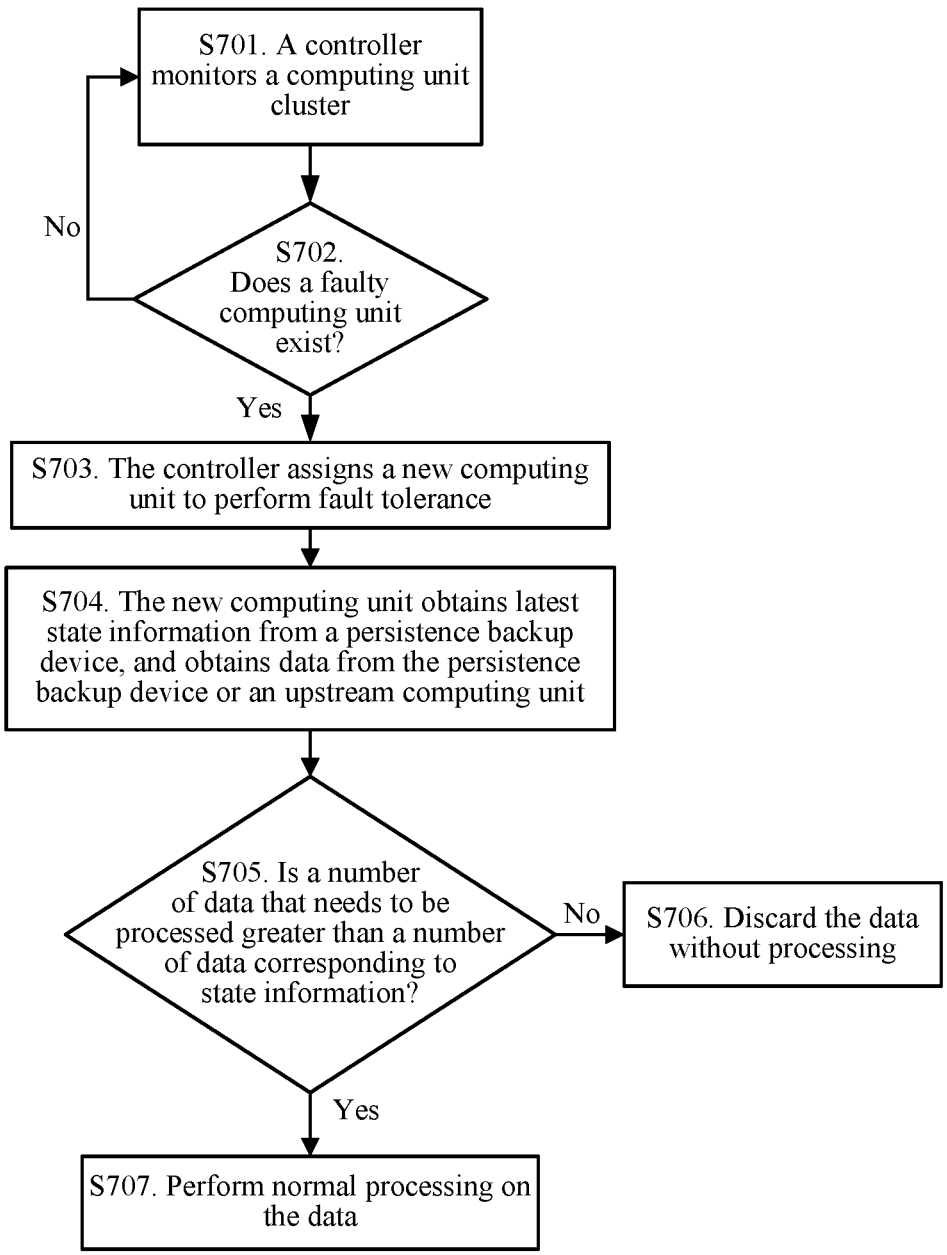
FIG. 8 is a schematic flowchart of fault tolerance according to an embodiment of this application.

FIG. 8 shows a schematic flowchart of fault tolerance according to an embodiment of this application. As shown in FIG. 8, a fault tolerance procedure 700 may include the following steps.

S701. A controller monitors a computing unit cluster.

S702. Determine whether a faulty computing unit exists. If yes, S703 is performed; or otherwise, S701 is performed.

S703. After finding the faulty computing unit, that is, a fourth computing unit, the controller assigns a new computing unit (for example, a first computing unit) to perform fault tolerance. From another perspective, the first computing unit receives recovery indication information sent by the controller, where the recovery indication information is used to instruct the first computing unit to substitute for the faulty fourth computing unit to perform computing processing.

S704. The first computing unit obtains latest state information from a persistence backup device; when the first computing unit determines, according to the latest state information, that the first computing unit needs to obtain data from a second computing unit, receiving, by the first computing unit, first receive data sent by the second computing unit includes: obtaining, by the first computing unit, the first receive data from the second computing unit according to the latest state information; or when the first computing unit determines, according to the latest state information, that the first computing unit needs to obtain data from the persistence backup device, the method further includes: obtaining, by the first computing unit, persistently backed-up second receive data from the persistence backup device according to the latest state information; performing, by the first computing unit, the computing processing on the second receive data, to generate multiple pieces of second state information and second send data, where the multiple pieces of second state information are used to indicate multiple second intermediate states formed in a process of performing the computing processing on the second receive data, each piece of second status information in the multiple pieces of second state information includes an intermediate result obtained in the process of performing the computing processing on the second receive data, and the second send data is data formed after the computing processing on the second receive data is completed; selectively and persistently backing up, by the first computing unit, the multiple pieces of second state information into the persistence backup device; and sending, by the first computing unit, the second send data to the third computing unit.

Specifically, the new computing unit, that is, the first computing unit, invokes a state obtaining API (that is, invoking a functional function RecoverState(State & state)), to obtain the latest state information that is persistently backed up by a system, that is, to obtain the stored latest state information from the persistence backup device. The first computing unit determines, according to the foregoing latest state information, whether the data needs to be obtained from the second computing unit or from the persistence backup device. When determining, according to the latest state information, that the data needs to be obtained from the second computing unit, the first computing unit may obtain the first receive data from the second computing unit by invoking a data receiving API, and substitute for the fourth computing unit for subsequent operation. When determining, according to the latest state information, that the data needs to be obtained from the persistence backup device, the first computing unit may obtain the persistently backed-up second receive data from the persistence backup device by invoking a data obtaining API (that is, invoking a functional function RecoverItem(Item & item)). Because the second receive data is obtained from the persistence backup device, the second receive data no longer needs to be selectively and persistently backed up. The first computing unit performs the computing processing on the second receive data by invoking a data processing API, to generate the multiple pieces of second state information and the second send data. The first computing unit selectively and persistently backs up the multiple pieces of second state information into the persistence backup device by invoking a selective backup function; and the first computing unit sends the second send data to the third computing unit. It should be understood that, in this case, if a data amount of first receive data in a receive buffer of the first computing unit is less than a first threshold l, the first computing unit may continue to obtain the first receive data from the second computing unit, and perform the computing processing on the second receive data and the first receive data.

S705. To avoid inconsistency and impact on performance that are caused by repeated data processing, a globally unique number may be used for all data in a distributed stream processing system. When the computing unit finds that a number of data is less than a number of data corresponding to a current latest state, S706 is performed; or otherwise, S707 is performed.

S706. Discard the data without processing.

S707. Perform normal processing on the data, that is, process only new unprocessed data (data whose number is greater than the current number).

In this embodiment of this application, when multiple failures occur on a same computing unit, a cumulative effect may be caused, and the computing unit severely affects overall performance and efficiency of the system. Therefore, the computing unit may make the following configuration: If a preset quantity or more of failures occur on a computing unit (for example, the first computing unit) within a preset time period, the first computing unit decreases a value of the first threshold and a value of a second threshold.

For example, initialization thresholds of the first computing unit are the first threshold l=L and the second threshold θ=Θ, respectively. In a specific example, when another failure occurs on the first computing unit within a time period t, the thresholds may be adjusted to be a half of the original thresholds, that is, the first threshold is $$l = \frac{L}{2}$$

and the second threshold is $$\theta = \frac{\Theta}{2}.$$

During k time periods t, when one failure occurs on the first computing unit within each time period t, the first threshold may be adjusted to $$l = \frac{L}{2^k},$$

and the second threshold may be adjusted to $$\theta = \frac{\Theta}{2^k}.$$

It may be understood that there are many specific implementations for adjusting a value of the threshold, and the foregoing implementation is merely an example instead of a limitation. It should be further understood that when fewer failures occur on the first computing unit within a preset time period, a value of the threshold may be properly increased. This is not limited in this embodiment of this application. The threshold may be specifically adjusted by the computing unit by invoking a threshold adjustment API.

In this embodiment of this application, when a selective persistence backup solution is used, a data backup module and a state backup module selectively and persistently back up data and state information, respectively. The data backup module and the state backup module may be considered as submodules of a selective backup module. Accordingly, three APIs: a data backup API (for example, BackupItem( )), a state divergence comparison API (for example, StateDivergence( )), and a state backup API (for example, BackupState( )) in the foregoing description may form a selective backup function. It should be understood that functions such as data backup, state divergence comparison, and state backup may be encapsulated together to form one API, that is, the selective backup function may also be one API. Alternatively, the state divergence comparison and state backup functions may be encapsulated together to form one API. The selective backup function includes a total of two APIs: an API formed by encapsulating the state divergence comparison and state backup functions and the data backup API. Alternatively, as described above, the selective backup function includes a total of three APIs: the data backup API, the state divergence comparison API, and the state backup API. Division of APIs in the selective backup function is not limited in this embodiment of this application.

In conclusion, an embodiment of this application provides a detailed implementation process of a downstream backup solution. Mainly from the perspective of selective persistence backup, a data processing method may include: receiving, by a first computing unit, first receive data sent by a second computing unit, where the second computing unit is upstream of the first computing unit; selectively and persistently backing up, by the first computing unit, the first receive data into a persistence backup device; performing, by the first computing unit, computing processing on the first receive data, to generate multiple pieces of first state information and first send data, where the multiple pieces of first state information are used to indicate multiple first intermediate states formed in a process of performing the computing processing on the first receive data, each piece of first state information in the multiple pieces of first state information includes an intermediate result obtained in the process of performing the computing processing on the first receive data, and the first send data is data formed after the computing processing on the first receive data is completed; selectively and persistently backing up, by the first computing unit, the multiple pieces of first state information into the persistence backup device; and sending, by the first computing unit, the first send data to a third computing unit, where the third computing unit is downstream of the first computing unit.

In a solution, the selectively and persistently backing up, by the first computing unit, the first receive data into a persistence backup device may include: making, by the first computing unit, a selection from the first receive data according to a user-defined data backup rule, and backing up selected first receive data into the persistence backup device; and the selectively and persistently backing up, by the first computing unit, the multiple pieces of first state information into the persistence backup device may include: making, by the first computing unit, a selection from the multiple pieces of first state information according to a user-defined state backup rule, and backing up selected first state information into the persistence backup device. In this solution, a selective persistence backup rule is opened to a user, and the user defines the data backup rule and/or the state backup rule. This can further improve backup efficiency.

In another solution, after the receiving, by a first computing unit, first receive data sent by a second computing unit, the method further includes: buffering, by the first computing unit, the first receive data in a receive buffer of the first computing unit; the selectively and persistently backing up, by the first computing unit, the first receive data into a persistence backup device includes: if an amount of data buffered in the receive buffer of the first computing unit is greater than a preset first threshold, persistently backing up, by the first computing unit, a first part of data over the first threshold in the first receive data into the persistence backup device; and the selectively and persistently backing up, by the first computing unit, the multiple pieces of first state information into the persistence backup device includes: if a divergence between a target intermediate result in target state information in the multiple pieces of first state information and a latest intermediate result in latest state information stored in the persistence backup device at a current moment is greater than a preset second threshold, persistently backing up, by the first computing unit, the target state information into the persistence backup device, where the target state information is any first status information in the multiple pieces of first state information. In this solution, backup thresholds are set for data and first state information. This can further improve the backup efficiency, reduce a total backup amount of data and first state information, and improve an overall throughput rate of a system.

In an optional solution, before the first computing unit completes the computing processing on the first receive data, the method may further include: feeding back, by the first computing unit, acknowledgement information to the second computing unit, where the acknowledgement information is used to instruct the second computing unit to delete, according to the acknowledgement information, the first receive data buffered in the second computing unit. In this solution, a downstream computing unit performs data backup, and the downstream computing unit can feed back acknowledgement information to an upstream computing unit before computing processing is completed, to instruct the upstream computing unit to delete corresponding data in a buffer. Buffer space can be freed up in time, and a speed at which the upstream computing unit frees up space, and receives and processes new data can be increased, so that a processing capability of the system is used more efficiently, and the overall throughput rate of the system can be improved.

Corresponding to the data processing method focusing on the selective persistence backup, the first computing unit may include a receiving module, a first computing module, a sending module, and a selective backup module, to implement the foregoing corresponding functions. The selective backup module may include two submodules: a data backup module and a state backup module, to implement selective persistence backup of data and selective persistence backup of state information, respectively. The first computing unit may further include a receive buffer, a send buffer, and the like, to buffer the first receive data or the first send data. The first computing unit may further include a processing module, to adjust a value of the first threshold and a value of the second threshold. The first computing unit may further include a fault tolerance module, to implement a fault tolerance process. The first computing unit may further include a feedback module, to feed back the acknowledgement information to the second computing unit.

Mainly from the perspective of downstream backup, a data processing method may include: receiving, by a first computing unit, first receive data sent by a second computing unit, and buffering the first receive data in a receive buffer of the first computing unit, where the second computing unit is upstream of the first computing unit; persistently backing up, by the first computing unit, the first receive data into a persistence backup devise; feeding back, by the first computing unit, acknowledgement information to the second computing unit, where the acknowledgement information is used to instruct the second computing unit to delete, according to the acknowledgement information, the first receive data buffered in the second computing unit; performing, by the first computing unit, computing processing on the first receive data, to generate first send data, where the first send data is data formed after the computing processing on the first receive data is completed; buffering, by the first computing unit, the first send data in a send buffer of the first computing unit; and sending the first send data to a third computing unit, where the third computing unit is downstream of the first computing unit.

According to the data processing method, a downstream computing unit performs data backup, and the downstream computing unit can feed back acknowledgement information to an upstream computing unit before computing processing is completed, to instruct the upstream computing unit to delete corresponding data in a buffer. Buffer space can be freed up in time, and a speed at which the upstream computing unit frees up space, and receives and processes new data can be increased, so that a processing capability of a system is used more efficiently, and an overall throughput rate of the system can be improved.

In an optional solution, the persistently backing up, by the first computing unit, the first receive data into a persistence backup devise may include: if an amount of data buffered in the receive buffer of the first computing unit is greater than a preset first threshold, persistently backing up, by the first computing unit, a first part of data over the first threshold in the first receive data into the persistence backup device; the method may further include: generating multiple pieces of first state information in a process of performing the computing processing on the first receive data, where the multiple pieces of first state information are used to indicate multiple first intermediate states formed in the process of performing the computing processing on the first receive data, and each piece of first state information in the multiple pieces of first state information includes an intermediate result obtained in the process of performing the computing processing on the first receive data; and if a divergence between a target intermediate result in target state information in the multiple pieces of first state information and a latest intermediate result in latest state information stored in the persistence backup device at a current moment is greater than a preset second threshold, persistently backing up, by the first computing unit, the target state information into the persistence backup device, where the target state information is any first status information in the multiple pieces of first state information. In this solution, backup thresholds are set for data and state information. This can further improve backup efficiency, reduce a total backup amount of data and state information, and improve the overall throughput rate of the system.

In an optional solution, the persistently backing up, by the first computing unit, the first receive data into a persistence backup devise includes: persistently backing up, by the first computing unit, all of the first receive data into the persistence backup device. In this solution, system reliability and accuracy can be ensured to a largest extent based on downstream backup.

Corresponding to the data processing method focusing on the downstream backup, the first computing unit may include a receiving module, a first receive buffer, a first computing module, a first send buffer, a sending module, a feedback module, and a data backup module, to implement the foregoing corresponding functions. The first computing unit may further include a state backup module, to implement backup of state information. The first computing unit may further include a processing module, to adjust a value of the first threshold and a value of the second threshold. The first computing unit may further include a fault tolerance module, to implement a fault tolerance process.

In the downstream backup solution, the method may further include: if a preset quantity or more of failures occur on the first computing unit within a preset time period, decreasing, by the first computing unit, a value of the first threshold and a value of the second threshold. This solution can prevent a cumulative effect caused because of multiple failures of a same computing unit, and prevent the computing unit from severely affecting overall performance and efficiency of the system.

In the downstream backup solution, before the receiving, by a first computing unit, first receive data sent by a second computing unit, the method may further include: receiving, by the first computing unit, recovery indication information sent by a controller, where the recovery indication information is used to instruct the first computing unit to substitute for a faulty fourth computing unit for operation; obtaining, by the first computing unit, the stored latest state information from the persistence backup device; and when the first computing unit determines, according to the latest state information, that the first computing unit needs to obtain data from the second computing unit, the receiving, by a first computing unit, first receive data sent by a second computing unit includes: obtaining, by the first computing unit, the first receive data from the second computing unit according to the latest state information; or when the first computing unit determines, according to the latest state information, that the first computing unit needs to obtain data from the persistence backup device, the method further includes: obtaining, by the first computing unit, persistently backed-up second receive data from the persistence backup device according to the latest state information; performing, by the first computing unit, the computing processing on the second receive data, to generate second send data, where the second send data is data formed after the computing processing on the second receive data is completed; buffering, by the first computing unit, the second send data in the send buffer of the first computing unit; and sending the second send data to the third computing unit.

The following deep error bound analysis is to be performed on the data processing method using downstream backup in this embodiment of this application. The error bound analysis is analysis on an error possibly introduced by a system or a method during quantitative assessment of accuracy of a calculation result of the system or the method, with expectations that the error is bounded (that is, controllable) and cannot be infinitely expanded.

In this application, a core of the solution in which the first threshold is set for the data backup and the second threshold is set for the state backup is to introduce a bounded error that is set by the system or that can be defined by a user, thereby reducing data backup and state backup frequencies and a backup data amount, and providing high reliability on the premise that accuracy and processing performance in distributed stream processing are ensured as much as possible.

After processing the input data, the currently discussed first computing unit generates processed data (that is, the first send data) and buffers the processed data in the first send buffer. The first send buffer sends the data to a downstream computing unit (for example, the third computing unit), and deletes the buffered first send data step by step after receiving the acknowledgement information of the third computing unit. To support the error bound analysis, a third threshold $\gamma$ is introduced herein. A meaning of the third threshold $\gamma$ is as follows: It is assumed that the third threshold $\gamma$ is set for the first send buffer; after an amount of data in the first send buffer reaches the third threshold $\gamma$, processing of the first computing unit is blocked, and processed data cannot continue to be added to the first send buffer until the data in the first send buffer is determined and deleted.

It may be concluded by setting the foregoing third threshold $\gamma$ that the first computing unit outputs the processed data, and a failure occurs if the first computing unit does not receive the acknowledgement information of the downstream computing unit (that is, the third computing unit). A maximum amount of data lost during the failure is a value $\gamma$ of the third threshold.

The following error bound analysis is performed on the data processing system in this embodiment of this application based on the first threshold l, the second threshold $\theta$, and the third threshold $\gamma$, to prove that after the data processing method (that is, processing of the approximation fault-tolerance solution procedure) in this embodiment of this application is used, data processing accuracy of the entire data processing system is still bounded and controllable.

In this embodiment of this application, the three different thresholds that are preset by the system or that can be defined by a user are introduced in the data processing system and are respectively:

the first threshold l: a maximum amount of unprocessed data that is not stored in the computing units;

the second threshold $\theta$: a threshold of a divergence between a currently generated state and a state that is currently persistently backed up; and a third threshold $\gamma$: a maximum amount of processed output data that has no response in the computing units.

In this embodiment of this application, during the error bound analysis, two basic analysis assumptions are made:

(1) In a distributed stream processing system, a loss of one data tuple (data item) usually has limited impact on accuracy of the analysis. For example, after one data tuple is processed, an intermediate state is obtained, a maximum divergence caused after an update is $\alpha$, and a maximum amount of processed data that is output is $\beta$ (that is, processing of one data tuple is corresponding to two constants $\alpha$ and $\beta$).

(2) An analysis error (error) is usually introduced during fault tolerance. Although a state of recovery processing is a latest backup state, instead of an ideal state (a case of no data and state loss), the error can be diluted or even ignored by processing enough data (for example, an iterative algorithm is used for repeated iterative optimization to obtain a global optimal solution or a local optimal solution, and an error caused due to a data loss is finally diluted in this process).

In this embodiment of this application, error boundedness is analyzed from the following two aspects by using the foregoing design and the basic assumptions. One aspect is a divergence (divergence) between an actual state and an ideal state; and the other aspect is an amount of processed output data (output items) that is lost.

The following provides detailed analysis and proof of error boundedness in different fault-tolerance scenarios.

Analysis of a single failure (single failure) of a single computing unit:

This scenario is corresponding to a case in which a data processing system detects that one failure (failure) occurs on only one computing unit in an entire process of data processing. An error is specifically analyzed as follows with reference to FIG. 9:

(1) Analysis of the Divergence Between the Actual State and the Ideal State:

According to the solution in this embodiment of this application, before a current computing unit (for example, the first computing unit) fails, a maximum divergence between a persistently stored latest state and the ideal state is θ=Θ; and a maximum data amount of input data that has been received by the current computing unit but has neither been processed nor been persistently stored and backed up is l=L.

Therefore, according to the basic assumptions in the foregoing description, an overall state divergence includes two parts: a current backup state divergence and a state divergence that may be caused by a data loss, and a maximum overall state divergence is Θ+L*α.

(2) Analysis of an Amount of Lost Output Data:

According to a definition of the preset third threshold, a maximum of γ=Γ pieces of processed output data that has no acknowledgement (no ACK information is returned) are lost in the current computing unit.

For input data (a maximum of l=L) that has been received but not processed by the current computing unit, a maximum of β pieces of processed output data is correspondingly generated.

Therefore, a maximum overall amount deviation of output data is Γ+L*β.

Analysis of Multiple Failures (Multiple Failures) of a Single Computing Unit:

This scenario is corresponding to a case in which a data processing system detects that multiple failures occur on one computing unit in an entire process of data processing. In this scenario, an objective of approximation analysis of the data processing system is that an error bound (error bound) is irrelevant to a quantity of failures. When multiple failures occur on the computing unit, a cumulative effect is generated. It is assumed that a quantity of failures is k. In this embodiment of this application, overall error boundedness can be ensured by properly setting three parameter thresholds.

Three initialization thresholds of the computing unit are a first threshold $$l = \frac{L}{2},$$

a second threshold $$\theta = \frac{\Theta}{2},$$

and a third threshold $$\gamma = \frac{\Gamma}{2},$$

respectively.

It is assumed that each time after a failure occurs, the system decreases values of the thresholds of the computing unit to a half of the original thresholds. After k failures occur, the three thresholds are changed as follows: the first threshold is $$l = \frac{L}{2^{k+1}},$$

the second threshold is $$\theta = \frac{\Theta}{2^{k+1}},$$

and the third threshold is $$\gamma = \frac{\Gamma}{2^{k+1}}.$$

A heuristic assumption used in the foregoing solution is as follows: If a distributed stream processing system is reliable enough, less or even no backup may be performed. On the contrary, if a distributed stream processing system has low reliability, backup needs to be frequently performed, to ensure system reliability at the cost of performance. Usually, few failures occur during normal processing. Therefore, the solution in this embodiment of this application can balance reliability and performance of the system to a largest extent.

Based on the foregoing threshold settings, the following may be proved by using a convergence of a geometric series.

(1) Analysis of the Divergence Between the Actual State and the Ideal State:

$$\lim_{n \to \infty} l_n = \frac{L}{2} + \frac{L}{4} + \ldots + \frac{L}{2^n} = L$$

$$\lim_{n \to \infty} \theta_n = \frac{\Theta}{2} + \frac{\Theta}{4} + \ldots + \frac{\Theta}{2^n} = \Theta$$

$$\lim_{n \to \infty} \gamma_n = \frac{\Gamma}{2} + \frac{\Gamma}{4} + \ldots + \frac{\Gamma}{2^n} = \Gamma$$

With reference to the foregoing conclusions, a result is proved to be the same as that of the scenario in which one failure occurs on a single computing unit, and a maximum state divergence of the computing unit is Θ+L*α.

(2) Analysis of an Amount of Lost Output Data:

Likewise, with reference to the convergence of the foregoing series, a data amount deviation is proved to be the same as that in the scenario in which one failure occurs on a single computing unit and is Γ+L*β.

Therefore, when multiple failures occur on a single computing unit, an overall error is irrelevant to a quantity of failures and is bounded and controllable.

Analysis of multiple failures on multiple computing units:

This scenario is corresponding to a case in which a data processing system detects that multiple failures occur on multiple computing units in an entire process of data processing. In this scenario, an objective of approximation analysis of the data processing system is that an error bound (error bound) is irrelevant to a quantity of failures and irrelevant to a quantity of computing units.

In this case, a small initialization threshold is used in a design of this embodiment of this application. For example, when a degree of parallelism of the computing units is n, an initialization threshold of each computing unit is:

$$\theta = \frac{\Theta}{2n}, l = \frac{L}{2n}, \gamma = \frac{\Gamma}{2n}$$

In a scenario in which m computing units perform pipeline processing, a threshold set for an $i^{th}$ computing unit is:

$$\theta = \frac{\Theta}{2\beta^{m-i}}, l = \frac{L}{2\beta^{m-i}}, \gamma = \frac{\Gamma}{2\beta^{m-i}}$$

A result obtained by using a method similar to the foregoing proving method using series convergence is as follows:

(1) Analysis of the Divergence Between the Actual State and the Ideal State:

With reference to the foregoing conclusions, a result is proved to be the same as that of the scenario in which one failure occurs on a single computing unit, and a maximum state divergence is $\Theta+L*\alpha$.

(2) Analysis of an Amount of Lost Output Data:

Likewise, with reference to the convergence of the foregoing series, a data amount deviation is proved to be the same as that in the scenario in which one failure occurs on a single computing unit and is $\Gamma+L*\beta$.

Therefore, when multiple failures occur on multiple nodes, an overall error is bounded and is irrelevant to a quantity of computing units and a quantity of failures.

The following discusses a verification result of an experiment in which a solution in an embodiment of this application is applied. The solution in this embodiment of this application is verified on an Amazon Elastic Compute Cloud (Amazon Elastic Compute Cloud, Amazon EC2) cluster. A controller (controller) and a backup server (backup server) are deployed on a node with a quad-core central processing unit (Central Processing Unit, CPU) and a 16 GB random access memory (RAM), and each worker (worker) node is deployed on each node with a 32-core CPU and a 60 GB RAM.

In an experimental test, five different stream processing methods and algorithms are considered, including: Globally search a Regular Expression and Print (Grep), WordCount, heavy hitter detection (Heavy Hitter Detection, HH Detection), online join, and online logistic regression (LR).

The last three algorithms are corresponding to three types of typical data processing: Data Synopsis (Data Synopsis), stream database query (Stream Database Query, and online machine learning (Online Machine Learning), respectively.

An entire processing procedure is divided into two stages in a pipelining manner: an upstream processing stage (Upstream stage) in which a source file is read and data is processed, sent, and output to downstream for further processing, and a downstream processing stage (Downstream stage) in which an algorithm is used for processing and analysis. Each upstream processing stage and each downstream processing stage include one or more upstream or downstream worker nodes. Each experimental test is performed 20 times. An average value is used as a final result, and is compared in detail with open-source platforms Spark Streaming and Storm.

Experiment 1

Three threshold parameters are set: $\Theta=10$ K, L=1 K, and $\Gamma=1$ K, respectively, to implement an approximation fault-tolerance solution, and compare the implementation with implementations of storm (Storm) and spark streaming (Spark Streaming) frameworks. FIG. 10 and FIG. 11 show performance comparison between a solution in an embodiment of this application and a conventional open-source solution.

A result show in FIG. 10 indicates that when Grep processing is performed, the approximation fault-tolerance solution in this embodiment of this application implements a performance gain that is 8 times and 40 times higher than those in the Spark Streaming and the Storm, respectively. Significant performance gains are brought mainly because the solution in this embodiment of this application greatly reduces persistence backup overheads and a more efficient and concise backup solution is used.

To perform fairer comparison, in a framework in this embodiment of this application, an existing fault-tolerance solution is implemented, including mini-batch (mini-batch) processing and upstream backup (upstream backup). A result in FIG. 11 indicates that the approximation fault-tolerance solution in this embodiment of this application can implement a higher throughput gain. A throughput is lower than 0.4 GB/s in both mini-batch processing and upstream backup solutions. However, in scenarios in which different algorithms are used for processing (Grep and WordCount) in this embodiment of this application, throughputs of 3.48 GB/s and 1.78 GB/s, that is, increasing to 8.7 times and 4.45 times, are implemented, respectively. The result indicates that the solution in this embodiment of this application greatly retains a throughput of an existing distributed stream processing system while ensuring reliability.

Experiment 2

The WordCount algorithm is used as an example for comparing impact of the threshold parameters on an experimental result. Keep $\Gamma=1$ K unchanged, and change $\Theta$ and L. It should be noted that when $\Theta$ and L are large enough, state backup and data backup may be disabled (which is equivalent to permitting a loss of much state information or data). FIG. 12 to FIG. 15 show experimental results in all dimensions.

Figure 12:
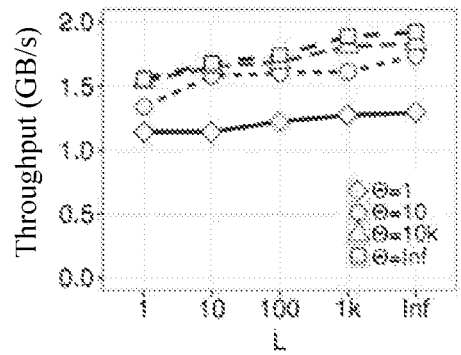
FIG. 12 to FIG. 15 show experimental results obtained by using an embodiment of this application.

FIG. 12 shows a variation trend of a throughput against L when different $\Theta$ values are set in an approximation fault-tolerance solution in an embodiment of this application. Performance comparison is made between enabling and disabling of a persistence backup function ($\Theta=\text{Inf}$). A result indicates that when it is set that $\Theta=10$ K, the solution in this application has little impact on performance.

Figure 13:
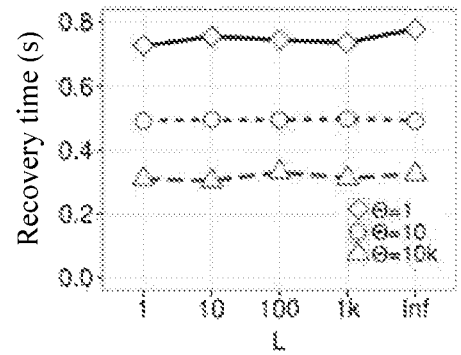

FIG. 13 shows time required for fault tolerance when different $\Theta$ is set. In all settings, recovery time is less than 1 s, which is far better than that in a current known backup fault-tolerance solution.

Figure 14:
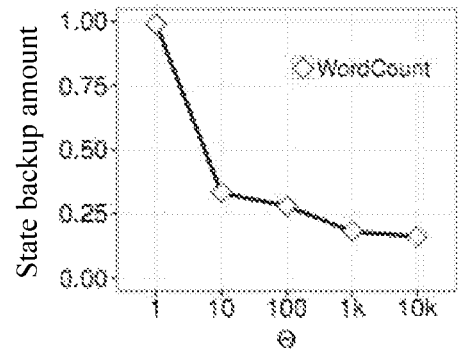

FIG. 14 indicates a total amount of data that needs to be backed up for the WordCount algorithm when different $\Theta$ is set. When $\Theta>10$ K, the total backup data amount is less than 30%. Therefore, an overall throughput of a system is greatly improved.

Figure 15:
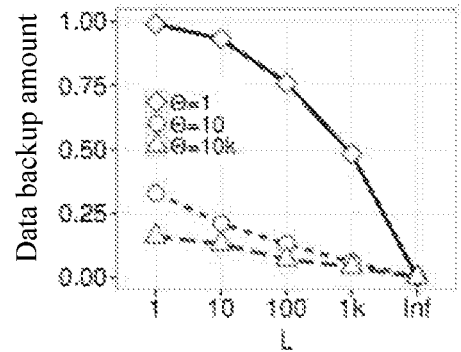

FIG. 15 indicates that an increase in the value of the threshold $\Theta$ also reduces a proportion of backup data. After $\Theta$ increases, a computing unit has more resources to process data, instead of participating in a backup operation. Therefore, an amount of unprocessed data is further reduced, and an amount of data that needs to be backed up is further reduced.

Experiment 3

A set of stream data is obtained from a CAIDA open data set, to perform a heavy hitter detection (Heavy Hitter Detection) experiment on a solution in an embodiment of this application. In this experiment, a heavy hitter stream is defined as a total amount of source-destination IP address pairs exceeding 10 MB. A classic Count-Min Sketch solution with a flow size of 40 GB is used for implementation in a system. Each worker node stores a Count-Min sketch data structure state with a size of 8 KB in four rows. An experimental result is shown in FIG. 16 and FIG. 17.

Figure 16:
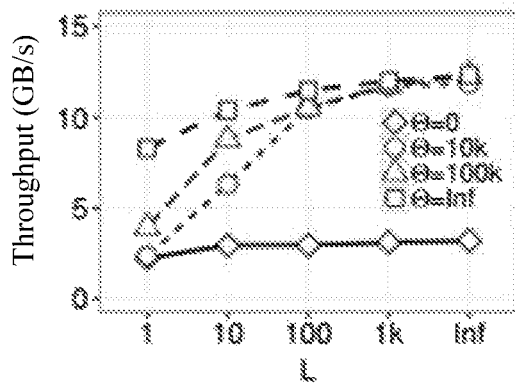
FIG. 16 and FIG. 17 show experimental results obtained by using another embodiment of this application.
Figure 17:
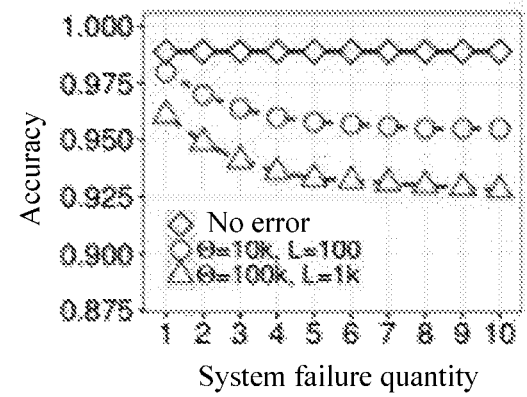

FIG. 16 and FIG. 17 show a relationship between a system throughput and accuracy of heavy hitter detection performed by using an approximation fault-tolerance solution in an embodiment of this application. When a state persistence backup function is disabled, and no failure occurs, an overall throughput reaches 12.33 GB/s, and analysis accuracy reaches 98.9%. When the approximation fault-tolerance solution in this embodiment of this application is used and it is set that $\Theta=100$ K and L=1 K, the overall throughput reduces by only 4.7%. When 10 errors occur, the accuracy still reaches 92.8%. When parameter settings are adjusted to $\Theta=10$ K and L=100 K, the throughput reduces by approximately 15%; however, the accuracy reaches 95.5%. The experimental result fully shows that the solution in this embodiment of this application implements an excellent balance between the overall system throughput, high reliability, and the accuracy.

Experiment 4

Online join (Online Join): Online join is a basic operation of a stream database query. In this experiment, a CAIDA IP data packet is still used, to perform an association operation on two data streams. An association objective is to return a destination IP address and a corresponding timestamp that match both the data streams. This means that the two data streams access a same host (host) at the same time. A distributed association algorithm is used to implement an association operation on multiple worker nodes. An experimental result is shown in FIG. 18 and FIG. 19.

Figure 18:
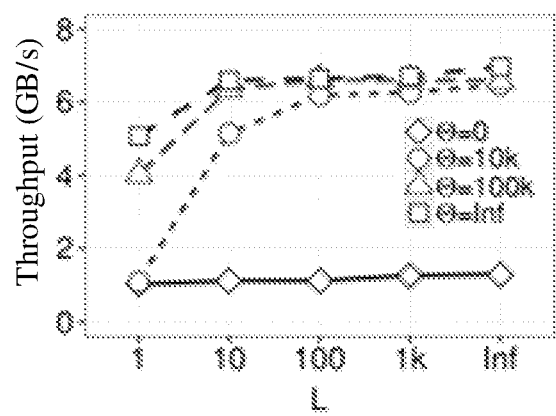
FIG. 18 and FIG. 19 show experimental results obtained by using still another embodiment of this application.
Figure 19:
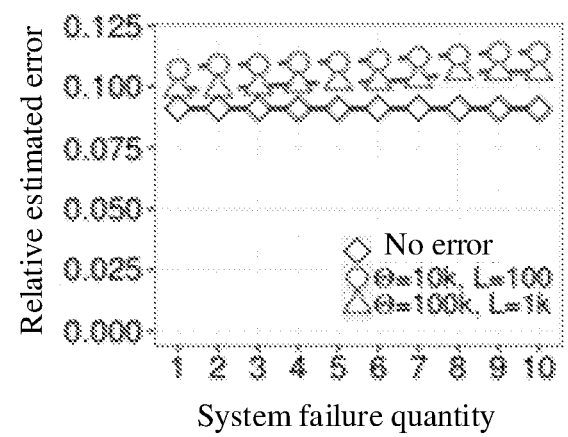

As shown in FIG. 18 and FIG. 19, in an ideal case in which a persistence backup function is disabled and no failure occurs, a system throughput reaches 6.96 GB/s, and a relative estimated error rate is 9.1%. In an approximation fault-tolerance solution in an embodiment of this application, when it is set that $\Theta=100$ K and L=1 K, and 10 failures occur, the system throughput reduces by 5.2%, and the relative estimated error rate increases by 11.3%. When it is set that $\Theta=10$ K and L=100 K, and 10 failures occur, the system throughput reduces by 12%, and the relative estimated error rate increases by 10.6%. The result also shows that the solution in this embodiment of this application implements an excellent balance between system performance, analysis accuracy, and high reliability.

Experiment 5

An online logistic regression (Online Logistic Regression) algorithm is a classic algorithm in machine learning. In this experiment, online LR is used to predict an advertisement click-through rate of KDD CUP 2012 Track 2 open data. A data set is evenly divided into two parts: one is for training, and the other is for testing. In the training, a distributed stochastic gradient descent (SGD) technology is used. Each upstream worker node uses some training data to train a local model, and then sends the local model to a same downstream node regularly (at an interval of 1 K tuples). Each upstream node stores a model parameter into a hash table and uses the model parameter as a state of the upstream node. A state deviation is defined as a Euclidean distance of the model parameter. After calculating an overall model parameter, the downstream node feeds back a global parameter to the upstream node by using a one-hop feedback mechanism for refresh. An experimental result is shown in FIG. 20 and FIG. 21.

Figure 20:
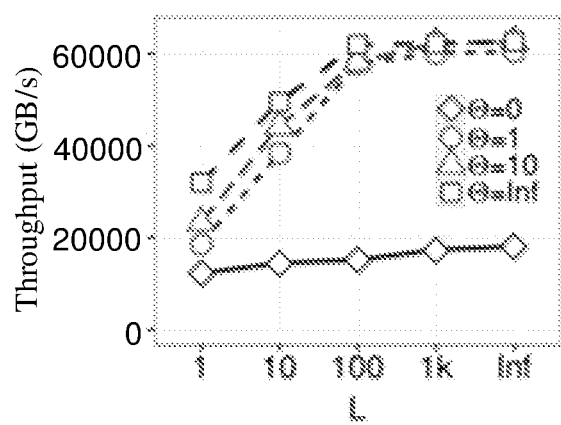
FIG. 20 and FIG. 21 show experimental results obtained by using still another embodiment of this application.
Figure 21:
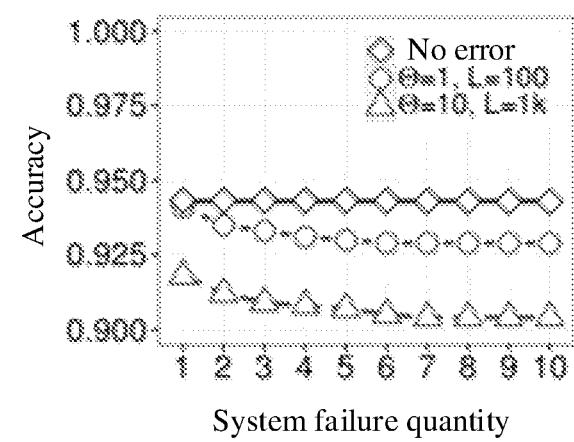

As shown in FIG. 20 and FIG. 21, when a persistence backup function is disabled, a system throughput is 62 K tuples/s. However, when an approximation fault-tolerance solution in an embodiment of this application is used and it is set that $\Theta=10$ and L=1 K, or $\Theta=1$ and L=100 K, the system throughput almost has no loss, because a model belongs to a high-dimensional parameter model, which has a feature of more than one million dimensions. Therefore, an excessively large calculation amount is introduced, and performance degradation resulted from state backup is no longer evident. In terms of accuracy, when no failure occurs, the accuracy reaches 94.3%. However, in the foregoing fault-tolerance solution in which different and L are set, when 10 failures occur, the accuracy still reaches 90.4% and 92.9%. This fully shows an advantage of the solution in this embodiment of this application.

Experiment 6

In this experiment, tests are performed on performance of a ring buffer (ring buffer) and a network queue (network queue) that are implemented in an embodiment of this application. Implementations of the foregoing two technologies are respectively corresponding to communication between threads and between worker nodes. An experimental result is shown in FIG. 22 and FIG. 23.

Figures 22, 23:
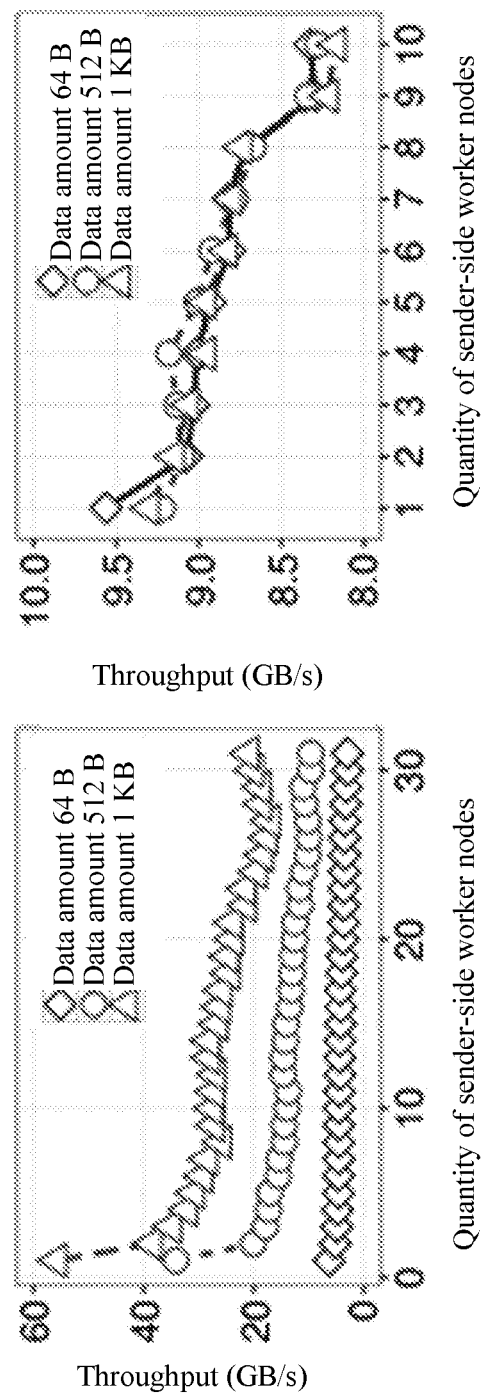
FIG. 22 and FIG. 23 show experimental results obtained by using still another embodiment of this application.

FIG. 22 shows a throughput performance test result of a ring buffer. In all test cases, performance is at least 3 GB/s, which is far higher than corresponding network bandwidth (10 Gb/s).

FIG. 23 shows throughput performance (Gb/s) of communication between networks. Because of contention, a throughput is reduced according to an increase in a quantity of sender-side worker nodes. However, when there are 10 sender-side worker nodes, the throughput can still reach 8 Gb/s, and overall performance is 4 times higher than that in a ZeroMQ open-source solution that is generally used in the industry.

An embodiment of this application further provides a data processing method using upstream backup. The method may include: receiving, by a first computing unit, first receive data sent by a second computing unit, where the second computing unit is upstream of the first computing unit; performing, by the first computing unit, computing processing on the first receive data, to generate multiple pieces of first state information and first send data, where the multiple pieces of first state information are used to indicate multiple first intermediate states formed in a process of performing the computing processing on the first receive data, each piece of first state information in the multiple pieces of first state information includes an intermediate result obtained in the process of performing the computing processing on the first receive data, and the first send data is data formed after the computing processing on the first receive data is completed; selectively and persistently backing up, by the first computing unit, the first send data and the multiple pieces of first state information into a persistence backup device; and sending, by the first computing unit, the first send data to a third computing unit, where the third computing unit is downstream of the first computing unit.

Execution of the processes of the receiving first receive data, the performing computing processing on the first receive data to generate multiple pieces of first state information and first send data, the selectively and persistently backing up the multiple pieces of first state information into a persistence backup device, and the sending the first send data to a third computing unit is the same as execution of corresponding processes in the downstream backup solution, and invoked APIs are similar. Details are not described herein.

The selectively and persistently backing up, by first computing unit, the first send data into a persistence backup device is also similar to the selectively and persistently backing up the first receive data into a persistence backup device in the downstream backup solution.

Specifically, a specific implementation may be as follows: the selectively and persistently backing up, by the first computing unit, the first send data and the multiple pieces of first state information into a persistence backup device may include: making, by the first computing unit, a selection from the first send data according to a user-defined data backup rule, and backing up selected first send data into the persistence backup device; and making, by the first computing unit, a selection from the multiple pieces of first state information according to a user-defined state backup rule, and backing up selected first state information into the persistence backup device. Certainly, the backup rule may also be pre-defined by a system or set to a system default rule. This is not limited in this embodiment of this application.

Another specific implementation may be as follows: after the first computing unit completes the computing processing on the first receive data and obtains the first send data, the method further includes: buffering, by the first computing unit, the first send data in a send buffer of the first computing unit; and the selectively and persistently backing up, by the first computing unit, the first send data and the multiple pieces of first state information into a persistence backup device includes: if an amount of data buffered in the send buffer of the first computing unit is greater than a preset third threshold, persistently backing up, by the first computing unit, a first part of data over the third threshold in the first send data into the persistence backup device; and if a divergence between a target intermediate result in target state information in the multiple pieces of first state information and a latest intermediate result in latest state information stored in the persistence backup device at a current moment is greater than a preset fourth threshold, persistently backing up, by the first computing unit, the target state information into the persistence backup device, where the target state information is any first status information in the multiple pieces of first state information.

In the upstream backup solution in this embodiment of this application, the method may further include: decreasing, by the first computing unit, a value of the third threshold and a value of the fourth threshold if a preset quantity or more of failures occur on the first computing unit within a preset time period.

In the upstream backup solution in this embodiment of this application, before the receiving, by a first computing unit, first receive data sent by a second computing unit, the method further includes: receiving, by the first computing unit, recovery indication information sent by a controller, where the recovery indication information is used to instruct the first computing unit to substitute for a faulty fourth computing unit for operation; and obtaining, by the first computing unit, the stored latest state information from the persistence backup device; and when the first computing unit determines, according to the latest state information, that the first computing unit needs to obtain data from the second computing unit, the receiving, by a first computing unit, first receive data sent by a second computing unit includes: obtaining, by the first computing unit, the first receive data from the second computing unit according to the latest state information; or when the first computing unit determines, according to the latest state information, that the first computing unit needs to obtain data from the persistence backup device, the method further includes: obtaining, by the first computing unit, persistently backed-up second receive data from the persistence backup device according to the latest state information; performing, by the first computing unit, the computing processing on the second receive data, to generate multiple pieces of second state information and second send data, where the multiple pieces of second state information are used to indicate multiple second intermediate states formed in a process of performing the computing processing on the second receive data, each piece of second status information in the multiple pieces of second state information includes an intermediate result obtained in the process of performing the computing processing on the second receive data, and the second send data is data formed after the computing processing on the second receive data is completed; selectively and persistently backing up, by the first computing unit, the multiple pieces of second state information into the persistence backup device; and sending, by the first computing unit, the second send data to the third computing unit.

Corresponding to the downstream backup solution in the embodiment of this application, the first computing unit may include a receiving module, a first computing module, a sending module, and a selective backup module, to implement the foregoing corresponding functions. The selective backup module may include two submodules: a data backup module and a state backup module, to implement selective persistence backup of data and selective persistence backup of state information, respectively. The first computing unit may further include a receive buffer, a send buffer, and the like, to buffer the first receive data or the first send data. The first computing unit may further include a processing module, to adjust a value of the first threshold and a value of the second threshold. The first computing unit may further include a fault tolerance module, to implement a fault tolerance process.

An embodiment of this application further provides a computing unit. The computing unit may be a first computing unit and includes an input interface, an output interface, a processor, and a storage. The input interface is configured to obtain first receive data. The storage is configured to buffer the first receive data or buffer first send data. The processor is configured to: perform persistence backup processing on data or state information, feed back acknowledgement information to an upstream computing unit, and generate the first send data and multiple pieces of first state information. The output interface is configured to send the first send data to a downstream computing unit. It should be understood that the storage may be a buffer. A receive buffer may be configured to buffer the first receive data, a send buffer may be configured to buffer the first send data, and the receive buffer and the send buffer may be configured in an integrated manner or may be configured independently.

The first computing unit is configured to complete the data processing method in the embodiments of this application, and a function of a corresponding component of the computing unit may be corresponding to a function of a corresponding module of the foregoing first computing unit. The components of the first computing unit may further have another function to complete the foregoing data processing method. Details are not described herein.

An embodiment of this application further provides a data processing apparatus, which is a data processing system. The data processing system may be a system shown in FIG. 1 and includes a controller 110, a persistence backup device 140, a data source node 120, an output destination node 130, and at least one first computing unit (for example, which are specifically a worker node 150, a worker node 160, a worker node 170, and a worker node 180 in FIG. 1), so as to complete the data processing method in the embodiments of this application.

Specifically, the controller is configured to: manage and maintain the at least one first computing unit, find a faulty first computing unit, and send recovery indication information to a substitute first computing unit that substitutes for the faulty first computing unit, to instruct the substitute first computing unit to substitute for the faulty first computing unit to perform computing processing. The persistence backup device is configured to store data or state information generated when the at least one first computing unit performs the computing processing. The data source node is configured to send to-be-processed data to a most-upstream first computing unit in the at least one first computing unit. The output destination node is configured to receive data that is formed after the computing processing is completed and that is sent by a most-downstream first computing unit in the at least one first computing unit.

Finally, an embodiment of this application further provides application programming interfaces (Application Programming Interface, API) related to data processing.

The APIs may mainly include: a data receiving API (for example, ReceiveDataItem( )), used to receive first receive data, or receive input data from a data source node or an upstream node;

a data processing API (for example, ProcessData( )), used to perform computing processing on the first receive data, or used to process the input data;

a selective backup function, used to selectively and persistently back up first send data (or the first receive data) and multiple pieces of first state information into a persistence backup device, where the selective backup function may specifically include a data backup API (for example, BackupItem( )), a state divergence comparison API (for example, StateDivergence( )), and a state backup API (for example, BackupState( )); and a data sending API, for example, SendDataItem(Item & feedback), sending the first send data to a third computing unit.

The APIs may further include a threshold adjustment API, configured to adjust a value of a threshold for backing up data or backing up state information;

a response feedback API, for example, SendFeedbackItem(Item & feedback), used to feed back acknowledgement information to a second computing unit (an upstream computing unit);

a state obtaining API (for example, RecoverState(State & state)), used to obtain backed-up state information from the persistence backup device during fault tolerance; and a data obtaining API (for example, RecoverItem(Item & item)), used to obtain backed-up data during the fault tolerance.

In this specification, an API may also be referred to as a functional interface or a functional function. The APIs numerated above are listed in Table 1 and Table 2. Table 1 provides an example of a definition of a system functional interface in this embodiment of this application.

TABLE 1

Definition of a system functional interface

| Functional entity | Functional interface | Description |
|---|---|---|
| Worker (worker) node | void AddUpstreamWorker(string & upName) | Add an upstream worker node |
| | void AddDownstreamWorker(string & downName) | Add a downstream worker node |
| | void AddUpstreamThread(Thread & thread) | Insert an upstream thread |
| | void AddDownstreamThread(Thread & thread) | Insert a downstream thread |
| | void AddComputeThread(Thread & thread) | Insert a compute thread |
| | void PinCPU(Thread & thread, int core) | Bind a thread to a specified CPU core |
| | void SetWindow(int type, int length) | Specify a size and a type of a window |
| | void Start( ) | Start a worker node |
| Compute thread (Compute thread) | void ConnectFromUpstreamThread( ) | Connect a compute thread and an upstream thread |
| | void ConnectToDownstreamThread( ) | Connect a compute thread and a downstream thread |
| | void ConnectToComputeThread(Thread & dstThread) | Connect a compute thread to another compute thread in series |
| | void SendToUp(string & upName, Item& feedback) | Send acknowledgement to an upstream worker node |
| | void SendToDown(string & downName, Item & data) | Send data to a downstream worker node |

Table 2 provides an example of a definition of a user-defined functional interface in this embodiment of this application. For specific content in Table 1 and Table 2, refer to API software code in an appendix.

TABLE 2

Definition of a user-defined functional interface

| Functional entity | Functional function | Description |
|---|---|---|
| Upstream thread (Upstream thread) | Item ReceiveDataItem( ) | Receive data: receive input data from a data source or an upstream node |
| | int GetDestComputeThread(Item & item) | Return a destination compute thread for data delivery |

TABLE 2-continued

Definition of a user-defined functional interface

| Functional entity | Functional function | Description |
|---|---|---|
|  | void SendFeedbackItem(Item & feedback) | Feed back a response: send acknowledgement information to an upstream worker node |
| Downstream thread (Downstream thread) | void SendDataItem(Item & feedback) | Send data: send processed output data |
|  | Item ReceiveFeedbackItem( ) | Receive acknowledgement information fed back by a downstream worker node |
| Compute thread (Compute thread) | bool ProcessData(Item & data) | Process data: process input data |
|  | bool ProcessFeedbackData(Item & feedback) | Process a feedback response |
|  | bool ProcessPunctuation(Item & punc) | Process and punctuate information data |
| Fault-tolerant operator (Fault-tolerant operator) | double StateDivergence( ) | Perform state divergence comparison: obtain a divergence between a latest backup state and an updated state after a worker node processes data |
|  | State BackupState( ) | Back up state information into a persistence backup server |
|  | void RecoverState(State & state) | Obtain state information that is backed up |
|  | Item BackupItem( ) | Back up data information into a persistence backup server |
|  | void RecoverItem(Item & item) | Obtain data that is backed up |

```
Appendix: API software code
/**********Composing interfaces in C++ Syntax ****************/
/**** APIs for worker****** */
+void AddUpstreamWorker(string & upName)        //adds an upstream worker
+void AddDownstreamWorker(string & downName) //adds a downstream worker
+void AddUpstreamThread(Thread & thread)        //plugs in the upstream thread
+void AddDownstreamThread(Thread & thread)      //plugs in the downstream thread
+void AddComputeThread(Thread & thread)         //plugs in the compute thread
+void PinCPU(Thread & thread, int core)         //pins a thread to a CPU core
+void SetWindow(int type, int length)           //Sets the type and length of a window
(the window type can be the hopping window, the sliding window, or the decaying window).
+void Start( )                                  //Starts the execution of the worker
/**** APIs for Compute thread****** */
+void ConnectFromUpstreamThread( )              //Associates the compute thread
with the upstream thread.
+void ConnectToDownstreamThread( )              //Associates the compute
thread with the downstream thread.
+void ConnectToComputeThread(Thread & dstThread)   //Connects the compute
thread to another compute thread.
+void SendToUp(string & upName, Item & feedback)   //Sends a feedback item
to an upstream worker
+void SendToDown(string & downName, Item & data)   //Sends a data item to a
downstream worker.
/**********User-defined interfaces in C++ Syntax ****************/
/**** APIs for Upstream thread****** */
+ Item ReceiveDataItem( )           //Receives an input item from data sources
or upstream workers.
+int GetDestComputeThread(Item & item)   //Returns the compute thread which an
item is dispatched.
+void SendFeedbackItem(Item & feedback)   //Sends a feedback item to an upstream
worker.
/**** APIs for Downstream thread****** */
+void SendDataItem(Item & feedback)  //Sends output items.
+Item ReceiveFeedbackItem( )         //Receives a feedback item from downstream
workers.
/**** APIs for compute thread****** */
+bool ProcessData(Item & data)              //Processes a data item.
+bool ProcessFeedbackData(Item & feedback) //Processes a feedback item.
+bool ProcessPunctuation(Item & punc)       //Processes a punctuation item.
/**** APIs for Fault-tolerant operator****** */
+double StateDivergence( )      //Gets the divergence of the up-to-date state and the
backup state.
+State BackupState( )           //Backups the state to AF-Stream.
+void RecoverState(State & state)   //Obtains the most recent backup state from
AF-Stream.
```

```
+ Item BackupItem( )       //Backups the Item to AF-Stream.
+void RecoverItem(Item & item)   //Obtains the Item from AF-Stream.
```

This embodiment of this application provides definitions of a distributed stream processing system and an API of a processing procedure. This can greatly facilitate implementation of a standardized and unified design of real-time big data stream processing, thereby bringing great convenience to application deployment and dynamic user adjustment and control. Certainly, all steps of the method in the embodiments of this application may not be implemented in a manner of invoking the API. This is not limited in the embodiments of this application.

It should be understood that the first state information and the second state information in the embodiments of this application are stored in the persistence backup device and become state information stored in the persistence backup device.

It should be further understood that the data processing method provided in the embodiments of this application is not only used in a distributed stream processing system, but may be similarly generalized to other intelligent analysis fields such as online learning and stream mining.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method performed by a worker node in a distributed data processing system including a plurality of worker nodes and a persistent storage device, the worker node including a compute thread, comprising:
receiving first data from an upstream worker node, the first data being stored in a local buffer of the upstream worker node;
allocating the received first data to the compute thread for computational processing;
sending a first portion of the first data to the persistent storage device of the distributed data processing system for persistent backup, wherein the persistent storage device is configured to communicate with all the plurality of worker nodes and to receive and store data or state information generated from each of the plurality of worker nodes when the respective worker node performs computational processing;
performing the computational processing on the first data by the compute thread to generate second data;
after allocating the received first data to the compute thread and prior to completing performing the computational processing on the first data, sending acknowledgement information to the upstream worker node to instruct the upstream worker node to delete the first data from the local buffer of the upstream worker node; and
sending the second data to a downstream worker node in the distributed data processing system for processing by the downstream worker node,
wherein the plurality of worker nodes includes the upstream worker node, the worker node and the downstream worker node.

2. The method according to claim 1, further comprising, after receiving the first data, buffering the first data in a local buffer of the worker node up to a first quantity,
- wherein the first portion of the first data sent to the persistent storage device comprises a remainder of the first data that is not buffered in the local buffer.

3. The method according to claim 1, wherein performing the computational processing on the first data by the compute thread comprises:
- generating multiple pieces of intermediate state information corresponding to multiple pieces of intermediate state information in processing the first data, wherein each piece of the multiple pieces of intermediate state information comprises an intermediate result obtained by the worker node; and
- sending the multiple pieces of intermediate state information to the persistence storage device for persistent backup.

4. The method according to claim 3, wherein sending the multiple pieces of intermediate state information to the persistent storage device comprises:
- determining that a divergence between a current intermediate result corresponding to current intermediate state information and a latest stored intermediate result already stored in the persistence storage device is greater than a divergence threshold; and
- sending the current intermediate state information to the persistence storage device for persistent backup.

5. The method according to claim 2, wherein sending the first portion of the first data to the persistent storage device for persistent backup comprises:
- determining whether an amount of the first data buffered in the local buffer of the worker node is equal to or larger than the first quantity; and
- upon determination that the amount of the first data buffered in the local buffer of the worker node is equal to or larger than the first quantity, sending the first portion of the first data to the persistent storage device for persistent backup, the first portion of the first data being the remainder of the first data that is not buffered in the local buffer.

6. A worker node in a distributed data processing system including a plurality of worker nodes and a persistent storage device, the worker node including a compute thread, comprising;
- a memory storing computer-executable instructions; and
- at least one processor configured to execute the computer-executable instructions to perform operations comprising:
  - receiving first data from an upstream worker node in the distributed data processing system, the first data being stored in a local buffer of the upstream worker node;
  - allocating the received first data to the compute thread for computational processing,
  - sending a first portion of the first data to the persistent storage device of the distributed data processing system for persistent backup, wherein the persistent storage device is configured to communicate with all the plurality of worker nodes and to receive and store data or state information generated from each of the plurality of worker nodes when the respective worker node performs computational processing;
  - performing the computational processing on the first data by the compute thread to generate second data; and
  - after allocating the received first data to the compute thread and prior to completing performing the computational processing on the first data, sending acknowledgement information to the upstream worker node to instruct the upstream worker node to delete the first data from the local buffer of the upstream worker node; and
  - sending the second data to a downstream worker node in the distributed data processing system for processing by the downstream worker node,
  - wherein the plurality of worker nodes includes the upstream worker node, the worker node and the downstream worker node.

7. The worker node according to claim 6, wherein the operations further comprise buffering the first data in a local buffer of the worker node up to a first quantity, and the first portion of the first data sent to the persistent storage device comprises a remainder of the first data that is not buffered in the local buffer.

8. The worker node according to claim 6, wherein the operations further comprise:
- generating multiple pieces of intermediate state information corresponding to multiple pieces of intermediate state information in processing the first data, wherein each piece of the multiple pieces of intermediate state information comprises an intermediate result obtained by the worker node; and
- sending the multiple pieces of intermediate state information to the persistence storage device for persistent backup.

9. The worker node according to claim 8, wherein the operations further comprise:
- determining that a divergence between a current intermediate result corresponding to current intermediate state information and a latest stored intermediate state result already stored in the persistence storage device is greater than a divergence threshold; and
- sending the current intermediate state information to the persistence storage device for persistent backup.

10. The worker node according to claim 6, wherein the first data is received from the upstream worker node via an intra-process communication protocol or an inter-process communication protocol.

11. The worker node according to claim 7, wherein sending the first portion of the first data to the persistent storage device for persistent backup comprises:
- determining whether an amount of the first data buffered in the local buffer of the worker node is equal to or larger than the first quantity; and
- upon determination that the amount of the first data buffered in the local buffer of the worker node is equal to or larger than the first quantity, sending the first portion of the first data to the persistent storage device for persistent backup, the first portion of the first data being the remainder of the first data that is not buffered in the local buffer.

12. The worker node according to claim 7, wherein the operations further comprise:
- determining whether a quantity of failures occurred on the worker node within a time period is larger than a failure threshold, and
- upon determination that the quantity of failures occurred on the worker node within the time period is larger than the failure threshold, decreasing the first quantity.

13. The worker node according to claim 9, wherein the operations further comprise:
- determining whether a quantity of failures occurred on the worker node within a time period is larger than a failure threshold, and upon determination that the quantity of failures occurred on the worker node within the time period is larger than the failure threshold, decreasing the divergence threshold.

* * * * *